US009572152B2

(12) United States Patent
Koorapaty et al.

(10) Patent No.: US 9,572,152 B2
(45) Date of Patent: Feb. 14, 2017

(54) BANDWIDTH ADAPTIVE REFERENCE SIGNALS

(75) Inventors: Havish Koorapaty, Saratoga, CA (US); Jung-Fu Cheng, Fremont, CA (US); Mattias Frenne, Uppsala (SE); Christian Hoymann, Aachen (DE); Daniel Larsson, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 879 days.

(21) Appl. No.: 13/595,227

(22) Filed: Aug. 27, 2012

(65) Prior Publication Data

US 2013/0250923 A1 Sep. 26, 2013

Related U.S. Application Data

(60) Provisional application No. 61/614,856, filed on Mar. 23, 2012.

(51) Int. Cl.
*H04L 12/26* (2006.01)
*H04W 72/04* (2009.01)
*H04L 5/00* (2006.01)

(52) U.S. Cl.
CPC .......... *H04W 72/0446* (2013.01); *H04L 5/005* (2013.01); *H04L 5/0007* (2013.01); *H04L 5/0064* (2013.01)

(58) Field of Classification Search
CPC ........... H04W 72/042; H04W 72/0453; H04W 72/0406; H04W 72/04; H04L 5/0048; H04L 5/0007; H04L 5/0051; H04L 5/0023; H04L 5/005; H04L 5/001; H04L 5/0094; H04L 5/0057; H04L 5/0092; H04L 5/0098

(Continued)

(56) References Cited

U.S. PATENT DOCUMENTS

2010/0238877 A1* 9/2010 Nam ............... H04L 5/0048 370/329
2010/0271965 A1* 10/2010 Siomina ........... H04L 5/0048 370/252

(Continued)

FOREIGN PATENT DOCUMENTS

WO WO2011009277 * 1/2011
WO WO2011017973 * 2/2011

OTHER PUBLICATIONS

Author Unknown, "Synchronization Performance on Additional Carrier Types," 3rd Generation Partnership Project (3GPP): 3GPP TSG RAN WG1 Meeting #68bis, Mar. 26-30, 2012, 9 pages, Jeju, Korea.

(Continued)

*Primary Examiner* — Chi H Pham
*Assistant Examiner* — Lionel Preval
(74) *Attorney, Agent, or Firm* — Withrow & Terranova, PLLC

(57) ABSTRACT

Systems and methods for providing bandwidth adaptive reference signals are disclosed. In one embodiment, a wireless device receives a downlink signal from a base station in a cellular communication network on a corresponding downlink carrier, where a number of time domain units per frame in the downlink signal that carry reference symbols is determined based on, or is otherwise a function of, a system bandwidth of the downlink carrier. In addition, in some embodiments, a number of frequency domain units that carry reference symbols is also a function of the system bandwidth of the downlink carrier. The wireless device processes the reference symbols to provide one or more desired features such as, for example, synchronization, radio resource management measurements, channel estimation, or the like.

34 Claims, 23 Drawing Sheets

(58) Field of Classification Search
USPC .......................... 370/336, 350, 312, 328, 329
See application file for complete search history.

(56) References Cited

U.S. PATENT DOCUMENTS

| | | | |
|---|---|---|---|
| 2012/0093101 A1* | 4/2012 | Dai ...................... | H04L 5/0048 370/329 |
| 2012/0155362 A1* | 6/2012 | Montojo et al. .............. | 370/312 |
| 2012/0218950 A1* | 8/2012 | Yu ........................ | H04L 5/0051 370/329 |
| 2013/0201975 A1* | 8/2013 | Chen et al. .................. | 370/336 |
| 2014/0226649 A1* | 8/2014 | Webb et al. .................. | 370/350 |
| 2014/0254504 A1* | 9/2014 | Bashar .................. | H04L 5/0048 370/329 |
| 2015/0009898 A1* | 1/2015 | Rosa et al. .................... | 370/328 |

OTHER PUBLICATIONS

Author Unknown, "Discussions on Additional Carrier Types in LTE Rel-11," 3rd Generation Partnership Project (3GPP): 3GPP TSG RAN WG1 Meeting #66bis, Oct. 10-14, 2011, 3 pages, Zhuhai, China.
International Search Report for PCT/IB2013/052221, mailed Jul. 22, 2013, 11 pages.

* cited by examiner

BANDWIDTH ADAPTIVE REFERENCE SIGNALS

RELATED APPLICATIONS

This application claims the benefit of provisional patent application Ser. No. 61/614,856, filed Mar. 23, 2012, the disclosure of which is hereby incorporated herein by reference in its entirety.

FIELD OF THE DISCLOSURE

The present disclosure relates to a cellular communication network and more particularly relates to transmission and reception of a downlink signal carrying a bandwidth adaptive reference signal.

BACKGROUND

3rd Generation Partnership Project (3GPP) Long Term Evolution (LTE) technology is a mobile broadband wireless technology in which transmissions from base stations, which are referred to as enhanced Node Bs (eNBs), to mobile stations, which are referred to as user equipments (UEs), are sent using Orthogonal Frequency Division Multiplexing (OFDM). OFDM splits the transmitted signal into multiple parallel sub-carriers in frequency. The basic unit of transmission in LTE is a Resource Block (RB), which in its most common configuration consists of 12 subcarriers and 7 OFDM symbols as illustrated in FIG. 1. A unit of 1 subcarrier frequency and 1 OFDM symbol is referred to as a Resource Element (RE), which is also illustrated in FIG. 1. Thus, a RB consists of 84 REs. As illustrated in FIG. 2, in the time domain, LTE downlink transmissions are organized into radio frames of 10 milliseconds (ms) each consisting of ten equally-sized subframes of 1 ms. Further, for normal downlink subframes, each subframe consists of two equally sized slots of 0.5 ms with each slot consisting of seven OFDM symbol periods.

An LTE subframe includes two slots in the time domain and a number of resource block pairs (RB pairs) in the frequency domain. A RB pair is the two RBs in a subframe that are adjacent in time. The number of RB pairs in the frequency domain determines a system bandwidth of the downlink carrier. Currently, system bandwidths supported by LTE correspond to the use of 6, 15, 25, 50, 75, or 100 RB pairs for the bandwidths of 1.4, 3, 5, 10, 15, and 20 Megahertz (MHz), respectively.

The signal transmitted by the eNB in a downlink subframe may be transmitted from multiple antennas, and the signal may be received at a UE that has multiple antennas. The radio channel distorts the transmitted signals from the multiple antenna ports. In order to demodulate any transmissions on the downlink carrier, a UE relies on Reference Symbols (RSs) that are included in the signal transmitted on the downlink carrier. These RSs and their positions in the time-frequency domain are known to the UE and hence can be used to determine channel estimates by measuring the effects of the radio channel on these symbols.

RSs are also used to perform time and frequency synchronization. There are two types of RSs that are present in LTE to facilitate time and frequency synchronization, namely, Primary and Secondary Synchronization Sequences (PSS/SSS) and Common Reference Symbols (CRSs). The Primary and Secondary Synchronization Sequences occur in the sixth and seventh OFDM symbol periods of every fifth subframe for frame structure 1 and are used for initial time and frequency synchronization to the system and cell identification. Therefore, when a UE wakes up from a cold start, the UE first scans for the Primary and Secondary Synchronization Sequences. Once coarse synchronization is achieved, CRSs are used to for fine synchronization to further reduce time and frequency errors. CRSs are also used for mobility measurements, which are also referred to as Radio Resource Management (RRM) measurements.

FIG. 3 illustrates one RB pair in an LTE subframe. As illustrated, the RB pair includes PSS/SSS locations in the sixth and seventh OFDM symbol periods of each RB. In addition, the RB pair includes CRS locations for two antenna ports, namely, port 0 and port 1. For port 0, the CRS locations are within the first and third last OFDM symbol periods of each RB and with a frequency domain spacing of six subcarriers. Further, there is a frequency-domain staggering of three sub-carriers for the CRSs within the third last OFDM symbol of each RB. During each RB pair, there are thus eight CRSs for port 0. Likewise, there are eight CRSs for port 1 in the RB pair arranged as illustrated.

In LTE Release 10 and prior releases of LTE, the CRS for a single antenna port is always present and is spread out as shown over all RBs and subframes whether any data is being sent to UEs in the subframe or not. This ensures very good time and frequency estimation performance but results in large overhead. Additionally, the CRSs create interference in the system that is independent of the data load being carried in a cell. So, even an "empty" subframe or RB generates interference. This interference degrades overall system throughput, especially in heterogeneous network environments where all eNBs do not transmit with the same power. For example, a macro eNB transmitting CRSs at high power can create significant interference to a UE receiving data transmissions from a pico eNB transmitting with low power. Another drawback with the CRSs is that the energy consumption of the eNBs is relatively high since CRSs are always transmitted in every RB of every subframe regardless of the data load being carried in the cell. This results in wasteful energy consumption. Thus, there is a need for systems and methods that reduce overhead and interference resulting from CRS transmissions.

SUMMARY

Systems and methods for providing bandwidth adaptive reference signals are disclosed. In one embodiment, a wireless device receives a downlink signal from a base station in a cellular communication network, where a number of time domain units per frame in the downlink signal that carry reference symbols is determined based on, or is otherwise a function of, a system bandwidth of the downlink carrier. In addition, in some embodiments, a number of frequency domain units that carry reference symbols is also a function of the system bandwidth of the downlink carrier. The wireless device processes the reference symbols to provide one or more desired features such as, for example, synchronization, radio resource management measurements, channel estimation, or the like. Preferably, the number of time domain units per frame that carry reference symbols and, in some embodiments, the number of frequency domain units that carry reference symbols is such that the number of reference symbols per frame is equal to or greater than a predetermined minimum number of reference symbols.

In one embodiment, the cellular communication network is a Long Term Evolution (LTE) network. A wireless device receives a downlink signal from a base station in the LTE network, where a number of subframes that carry Common Reference Symbols (CRSs) per frame is determined based on, or is otherwise a function of, a system bandwidth of the downlink carrier. In addition, in some embodiments, a number of resource blocks in the frequency dimension that carry CRSs is determined based on, or is otherwise a function of, the system bandwidth of the downlink carrier. The wireless device processes the CRSs in the downlink signal to provide one or more features such as, for example, synchronization, radio resource management measurements, channel estimation, or the like. Preferably, the number of subframes per frame that carry CRSs and, in some embodiments, the number of resource blocks in the frequency dimension that carry CRSs is such that the number of CRSs per frame is equal to or greater than a predetermined minimum number of CRSs.

In another embodiment, the cellular communication network is an LTE network. A wireless device receives a downlink signal from a base station in the LTE network, where a number of Orthogonal Frequency Division Multiplexing (OFDM) symbol periods that carry CRSs per frame is determined based on, or is otherwise a function of, a system bandwidth of the downlink carrier. In addition, in some embodiments, a number of resource blocks in the frequency dimension that carry CRSs is determined based on, or is otherwise a function of, the system bandwidth of the downlink carrier. The wireless device processes the CRSs in the downlink signal to provide one or more features such as, for example, synchronization, radio resource management measurements, channel estimation, or the like. Preferably, the number of OFDM symbol periods per frame that carry CRSs and, in some embodiments, the number of resource blocks in the frequency dimension that carry CRSs is such that the number of CRSs per frame is equal to or greater than a predetermined minimum number of CRSs.

In another embodiment, a wireless device determines a system bandwidth of a downlink carrier for a downlink signal received from a base station in a cellular communication network. The wireless device determines a number of time domain units per frame in the downlink signal that carry reference symbols based on the system bandwidth of the downlink carrier. In addition, in some embodiments, the wireless device determines a number of frequency domain units that carry reference symbols based on the system bandwidth of the downlink carrier. The wireless device receives a downlink signal and processes the reference symbols carried in the downlink signal to provide one or more desired features such as, for example, synchronization, radio resource management measurements, channel estimation, or the like. Preferably, the number of time domain units per frame that carry reference symbols and, in some embodiments, the number of frequency domain units that carry reference symbols is such that the number of reference symbols per frame is equal to or greater than a predetermined minimum number of reference symbols. As discussed above, in one embodiment, the cellular communication network is an LTE network where the number of time domain units per frame is a number of subframes per frame and the number of frequency domain units is a number of resource blocks in the frequency dimension. In another embodiment, the cellular communication network is an LTE network where the number of time domain units is a number of OFDM symbol periods and the number of frequency domain units is a number of resource blocks in the frequency dimension.

In another embodiment, a wireless device in a cellular communication network determines a system bandwidth of a downlink carrier from a base station to the wireless device based on a number of subframes per frame that carry reference symbols.

In another embodiment, a base station in a cellular communication network transmits a downlink signal where a number of time domain units per frame in the downlink signal that carry reference symbols is determined based on, or is otherwise a function of, a system bandwidth of the downlink carrier. In addition, in some embodiments, the base station transmits the downlink signal such that a number of frequency domain units that carry reference symbols is determined based on, or is otherwise a function of, the system bandwidth of the downlink carrier. Preferably, the number of time domain units per frame that carry reference symbols and, in some embodiments, the number of frequency domain units that carry reference symbols is such that the number of reference symbols per frame is equal to or greater than a predetermined minimum number of reference symbols. As discussed above, in one embodiment, the cellular communication network is an LTE network where the number of time domain units per frame is a number of subframes per frame and the number of frequency domain units is a number of resource blocks in the frequency dimension. In another embodiment, the cellular communication network is an LTE network where the number of time domain units is a number of OFDM symbol periods and the number of frequency domain units is a number of resource blocks in the frequency dimension.

In another embodiment, a base station in a cellular communication network determines a system bandwidth of a downlink carrier of a downlink signal received from the base station. The base station determines a number of time domain units per frame in the downlink signal that are to carry reference symbols based on the system bandwidth of the downlink carrier. In addition, in some embodiments, the base station determines a number of frequency domain units that are to carry reference symbols based on the system bandwidth of the downlink carrier. The base station transmits a downlink signal including the determined number of time domain units per frame carrying reference symbols and, in some embodiments, the determined number of frequency domain units carrying reference symbols. Preferably, the number of time domain units per frame that carry reference symbols and, in some embodiments, the number of frequency domain units that carry reference symbols is such that the number of reference symbols per frame is equal to or greater than a predetermined minimum number of reference symbols. As discussed above, in one embodiment, the cellular communication network is an LTE network where the number of time domain units per frame is a number of subframes per frame and the number of frequency domain units is a number of resource blocks in the frequency dimension. In another embodiment, the cellular communication network is an LTE network where the number of time domain units is a number of OFDM symbol periods and the number of frequency domain units is a number of resource blocks in the frequency dimension.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
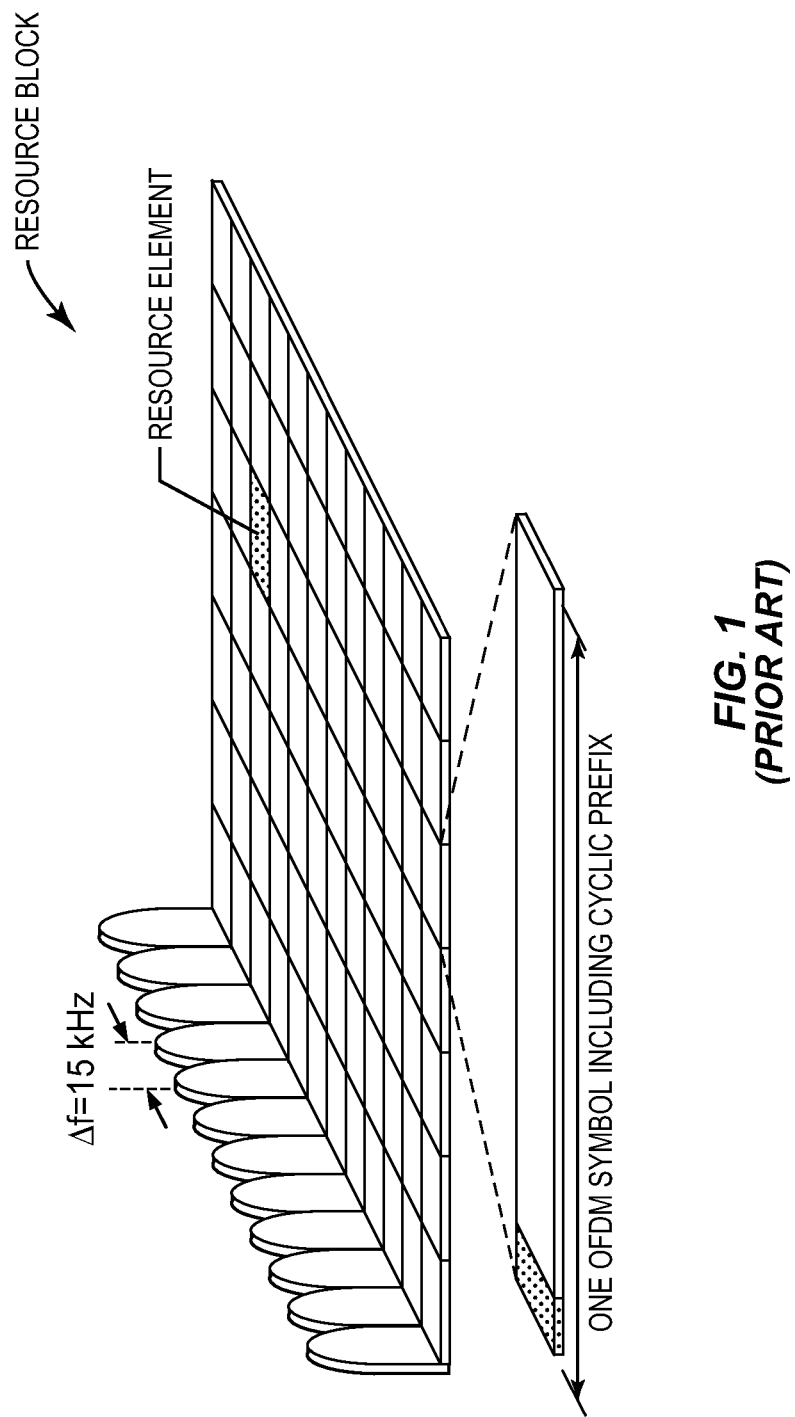
FIG. 1 illustrates a resource block in a conventional Long Term Evolution (LTE) downlink carrier.
Figure 2:
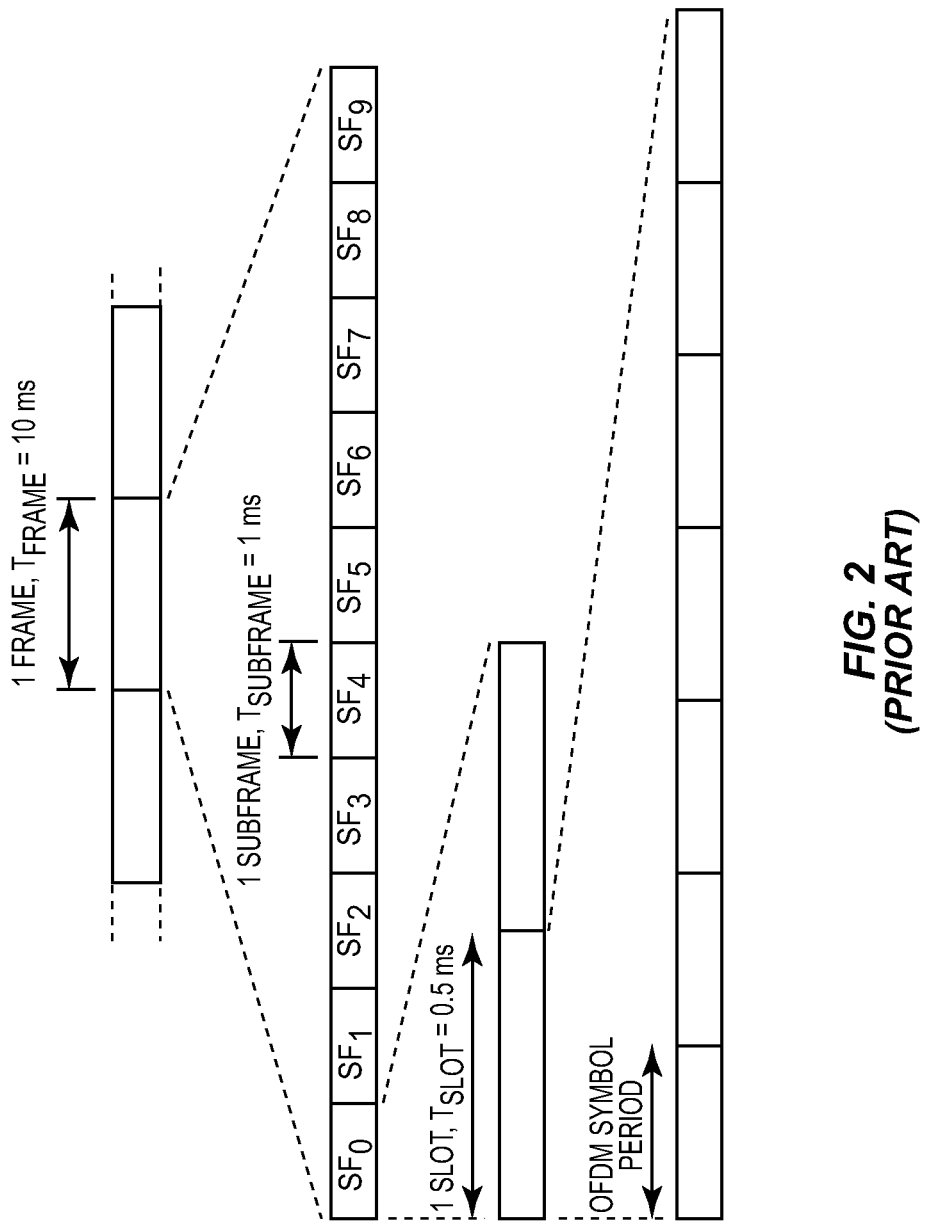
FIG. 2 illustrate a frame structure of a conventional LTE downlink carrier.
Figure 3:
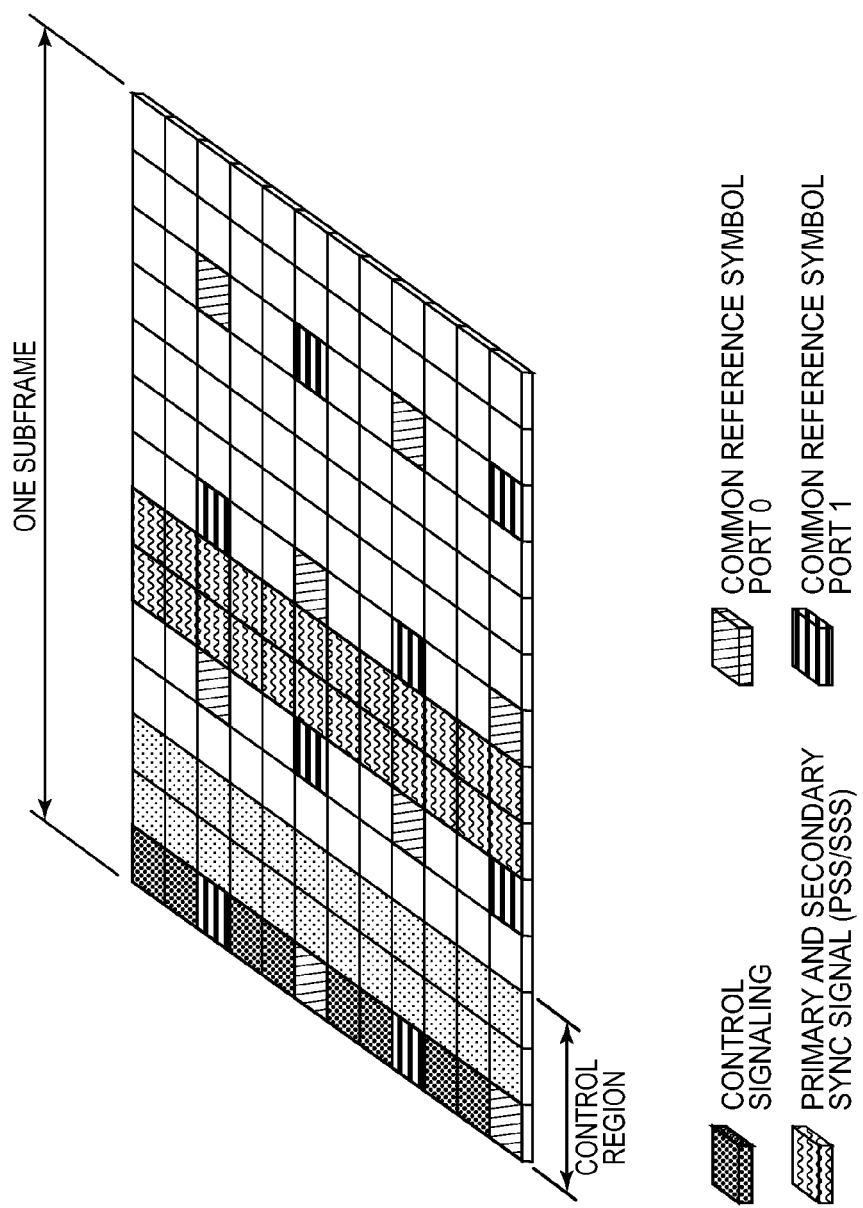
FIG. 3 illustrates a conventional LTE subframe.
Figure 4:
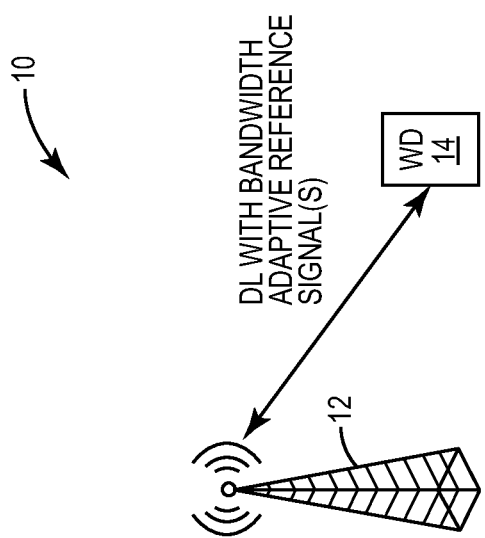
FIG. 4 illustrates a cellular communication network that provides a downlink signal carrying a bandwidth adaptive reference signal according to one embodiment of the present disclosure.

Systems and methods for providing bandwidth adaptive reference signals are disclosed. In this regard, FIG. 4 illustrates a cellular communication network 10 that provides bandwidth adaptive reference signals according to one embodiment of the present disclosure. As illustrated, the cellular communication network 10 includes a base station 12 and a wireless device 14 that is served by the base station 12. In the preferred embodiment described herein, the cellular communication network 10 is a 3rd Generation Partnership Project (3GPP) Long Term Evolution (LTE) network, and the base station 12 is an enhanced NodeB (eNB) or a low power eNB (e.g., a pico eNB). Note, however, that the concepts disclosed herein are not limited to an LTE network.

As discussed below in detail, the base station 12 provides a downlink signal on a downlink carrier, where the downlink signal carries, or includes, a bandwidth adaptive reference signal. In general, a number of time domain units (e.g., subframes) per frame of the downlink signal that carry reference symbols is a function of a system bandwidth of the downlink carrier. In addition, a number of frequency domain units in a frequency dimension of the downlink signal that carry reference symbols may also be a function of the system bandwidth of the downlink carrier. The number of time domain units per frame of the downlink signal that carry reference symbols and, in some embodiments, the number of frequency domain units in the frequency dimension that carry reference symbols are a function of the system bandwidth such that a number of reference symbols per frame of the downlink signal is greater than or equal to a predetermined minimum number of reference symbols per frame. The predetermined minimum number of reference symbols per frame is generally selected to provide at least a desired performance characteristic. The performance characteristic of interest could include time and frequency synchronization and/or channel estimation performance.

In the preferred embodiments, the cellular communication network 10 is an LTE network. In the preferred LTE embodiments, a number of subframes or a number of Orthogonal Frequency Division Multiplexing (OFDM) symbol periods per frame in the downlink signal that carry Common Reference Symbols (CRSs) is a function of a system bandwidth of the downlink carrier. Currently, the system bandwidth of an LTE downlink carrier can be 6, 15, 25, 50, 75, or 100 Resource Block (RB) pairs for the bandwidths of 1.4, 3, 5, 10, 15, and 20 Megahertz (MHz), respectively. In general, as the system bandwidth of the downlink carrier decreases, the number of subframes or OFDM symbol periods per frame that carry CRSs increases. In addition, in some embodiments, a number of RBs in the frequency dimension of the downlink signal that carry CRSs is also a function of the system bandwidth of the downlink carrier.

The wireless device 14 receives the downlink signal from the base station 12 and performs one or more operations using the reference symbols carried in the downlink signal. The one or more operations may include, but are not limited to, time and/or frequency synchronization, channel estimation, or the like. For LTE, the one or more operations may additionally or alternatively include obtaining one or more Radio Resource Management (RRM) measurements using the CRSs carried in the downlink signal.

Figure 5:
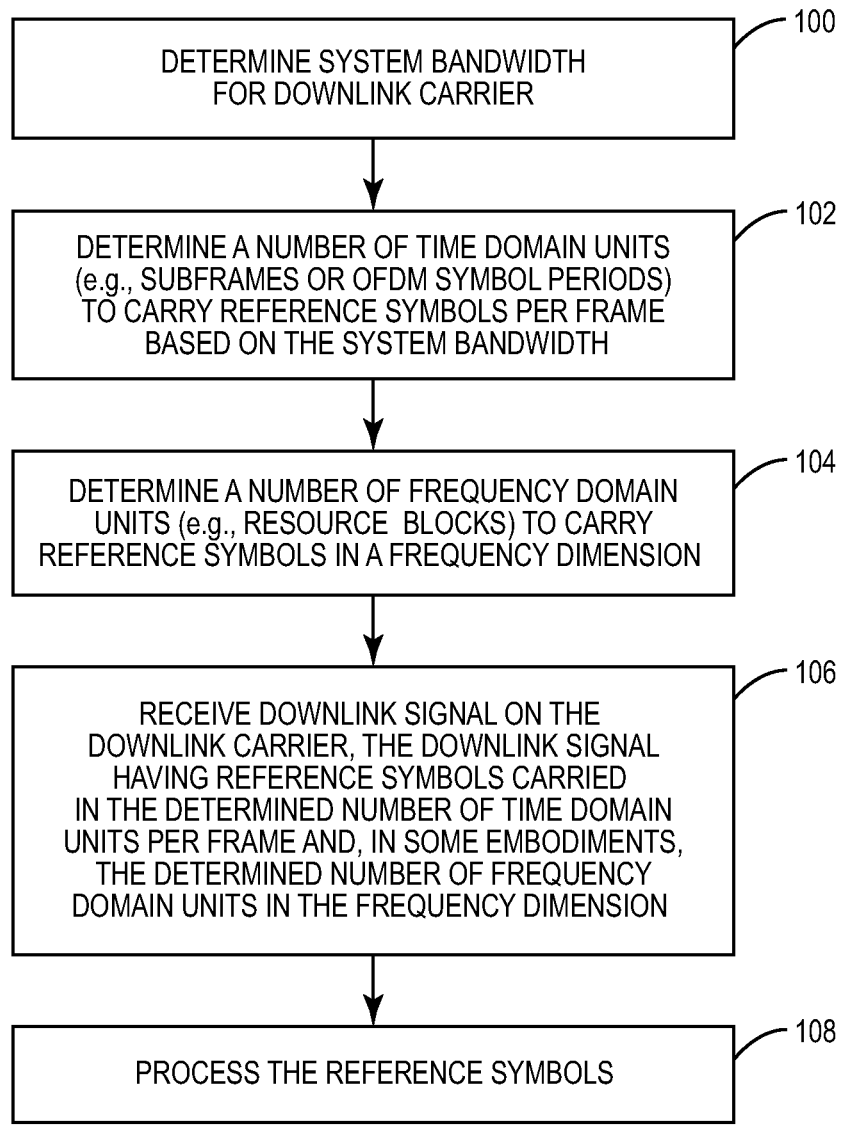
FIG. 5 is a flow chart that illustrates the operation of the wireless device of FIG. 4 to receive and process a downlink signal carrying a bandwidth adaptive reference signal according to one embodiment of the present disclosure.

FIG. 5 is a flow chart that illustrates the operation of the wireless device of FIG. 4 according to one embodiment of the present disclosure. First, the wireless device 14 determines the system bandwidth of the downlink carrier (step 100). For LTE, the system bandwidth may be expressed as a number of resource block pairs (RB pairs) per subframe. In one embodiment, the wireless device 14 determines the system bandwidth by receiving an indicator of the system bandwidth of the downlink carrier from the base station 12 via appropriate signaling. For LTE, the system bandwidth of the downlink carrier may be communicated to the wireless device 14 via an applicable parameter in the Physical Broadcast Channel (PBCH), in a System Information Block (SIB), through signaling specific to the wireless device 14, or a similar higher layer signaling mechanism. In another embodiment, which is discussed below in detail, the wireless device 14 determines the system bandwidth of the downlink carrier by detecting the number of time domain units (e.g., subframes or OFDM symbol periods) that carry reference symbols per frame.

Next, the wireless device 14 determines a number of time domain units (e.g., subframes or OFDM symbol periods) that carry reference symbols per frame based on, or otherwise as a function of, the system bandwidth of the downlink carrier (step 102). In some embodiments, the wireless device 14 also determines a number of frequency domain units in the frequency dimension of the downlink signal (e.g., resource blocks) that carry reference symbols based on, or otherwise as a function of, the system bandwidth of the downlink carrier (step 104). Notably, before proceeding, it should be noted that in this embodiment, steps 100 through 104 are programmatically performed by the wireless device 14 and may, in some embodiments, be repeated if desired. As an example, steps 100 through 104 may be performed when the wireless device 14 performs a cold start in a new cellular communication network. However, in an alternative embodiment, steps 100 through 104 are performed during design or manufacturing of the wireless device 14 such that the system bandwidth of the downlink carrier, the number of time domain units per frame that carry reference symbols, and, in some embodiments, the number of frequency domain units that carry reference symbols in the frequency dimension are determined by the designer or manufacturer of the wireless device 14 and hard-coded into the wireless device 14.

Next, the wireless device 14 receives a downlink signal, where the downlink signal has reference symbols carried in the determined number of time domain units per frame and, in some embodiments, the determined number of frequency domain units (step 106). The wireless device 14 performs one or more operations using the reference symbols carried in the downlink signal (step 108). Again, the one or more operations may include, but are not limited to, time and/or frequency synchronization, channel estimation, or the like. For LTE, the one or more operations may additionally or alternatively include obtaining one or more RRM measurements using the CRSs carried in the downlink carrier.

Before proceeding, as discussed above, in the preferred embodiments disclosed herein, the cellular communication network 10 is an LTE network. As such, the remainder of this discussion focuses on the preferred LTE embodiments and, therefore, LTE terminology is used. However, again, the concepts disclosed herein are not limited to LTE and may be used in any suitable type of network.

Figure 6:
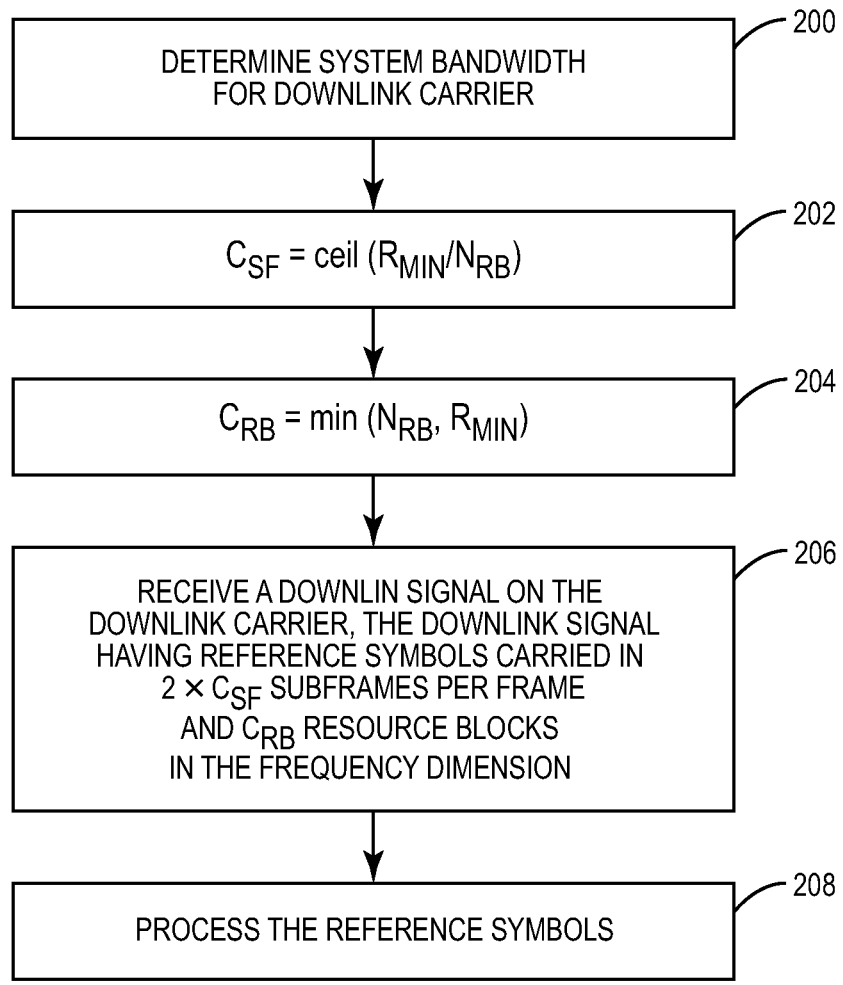
FIG. 6 is a flow chart that illustrates the operation of the wireless device of FIG. 4 to receive and process a downlink signal carrying a bandwidth adaptive reference signal according to one particular embodiment of the present disclosure.

FIG. 6 is a flow chart that illustrates the operation of the wireless device 14 of FIG. 4 according to a first particular embodiment of the present disclosure. In this embodiment, the cellular communication network 10 is an LTE network. First, the wireless device 14 determines the system bandwidth of the downlink carrier (step 200). For LTE, the system bandwidth may be expressed as a number of RBs in the frequency dimension of the downlink carrier (i.e., the number of RB pairs per subframe). In one embodiment, the wireless device 14 determines the system bandwidth by receiving an indicator of the system bandwidth of the downlink carrier from the base station 12 via appropriate signaling. For LTE, the system bandwidth of the downlink carrier may be communicated to the wireless device 14 via an applicable parameter in PBCH, in a SIB, through signaling specific to the wireless device 14, or a similar higher layer signaling mechanism. In another embodiment, which is discussed below in detail, the wireless device 14 determines the system bandwidth of the downlink carrier by detecting the number of subframes or, alternatively, OFDM symbol periods that carry reference symbols per frame.

Next, the wireless device 14 determines a number of subframes ($C_{SF}$) that carry CRSs per half frame, based on, or otherwise as a function of, the system bandwidth of the downlink carrier (step 202). More specifically, in this embodiment, the number of subframes ($C_{SF}$) that carry CRSs per half frame, is defined as:

$$C_{SF} = ceil\left(\frac{R_{MIN}}{N_{RB}}\right), \qquad \text{Eq. 1}$$

where ceil( ) is the ceiling function which maps a real number to the smallest following integer, $R_{MIN}$ is a predetermined minimum number of RB pairs per half frame, required to carry CRSs, and $N_{RB}$ is the system bandwidth of the downlink carrier expressed as a number of RBs. Notably, $R_{MIN}$ is one way to express a predetermined number of reference symbols per half frame. From Equation 1, the number of subframes that carry CRSs per frame can be expressed as $2 \cdot C_{SF}$. Similarly, a predetermined minimum number of RB pairs per frame, that are required to carry CRSs can be defined as $2 \cdot R_{MIN}$.

The wireless device 14 also determines a number of RBs in the frequency domain of the downlink signal that carry CRSs ($C_{RB}$) based on, or otherwise as a function of, the system bandwidth of the downlink carrier (step 204). More specifically, in this embodiment, the number of RBs in the frequency dimension of the downlink carrier ($C_{RB}$) that carry CRSs is defined as:

$$C_{RB} = min(N_{RB}, R_{MIN}), \qquad \text{Eq. 2}$$

where min( ) is a minimum function that returns a minimum of $N_{RB}$ and $R_{MIN}$. According to Equations 1 and 2, CRSs may not occupy all subframes within a frame or the entire system bandwidth. The wireless device 14 may compute $C_{SF}$ and $C_{RB}$ according to Equations 1 and 2, determine $C_{SF}$ and $C_{RB}$ using appropriate look-up tables, or the like.

The RBs in the frequency dimension of the downlink carrier that carry the CRSs are preferably in the center of the system bandwidth. In one particular embodiment, the CRSs are present in at least those subframes in which Primary Synchronization Sequences (PSS) and Secondary Synchronization Sequences (SSS) are transmitted. If $C_{SF}>1$, then for each half frame, an additional $C_{SF}-1$ subframes carry CRS, and these additional $C_{SF}-1$ subframes may be directly adjacent to the subframe in which PSS and SSS are transmitted, either before the subframe in which PSS and SSS are transmitted, following the subframe in which PSS and SSS are transmitted, or both. The relationship of the locations of the subframes that carry CRSs to the location of the subframe in which PSS and SSS are transmitted are preferably predefined and known to the wireless device 14. Furthermore, there are two subframes per frame that carry PSS and SSS and there will be $2 \cdot C_{SF}$ subframes that carry CRS per frame.

In this embodiment, steps 200 through 204 are programmatically performed by the wireless device 14 and may, in some embodiments, be repeated if desired. As an example, steps 200 through 204 may be performed when the wireless device 14 performs a cold start in a new cellular communication network. However, in an alternative embodiment, steps 200 through 204 are performed during design or manufacturing of the wireless device 14 such that the system bandwidth of the downlink carrier, the number of subframes that carry CRSs per half frame, and the number of RBs in the frequency dimension that carry CRSs are determined by the designer or manufacturer of the wireless device 14 and hard-coded into the wireless device 14.

Next, the wireless device 14 receives a downlink signal, where the downlink signal has CRSs carried in the determined number subframes per half frame and the determined number of RBs in the frequency dimension of the downlink signal (step 206). The wireless device 14 performs one or more operations using the CRSs carried in the downlink signal (step 208). Again, the one or more operations may include, but are not limited to, time and/or frequency synchronization, channel estimation, or the like. For LTE, the one or more operations may additionally or alternatively include obtaining one or more RRM measurements using the CRSs carried in the downlink carrier.

Figure 7:
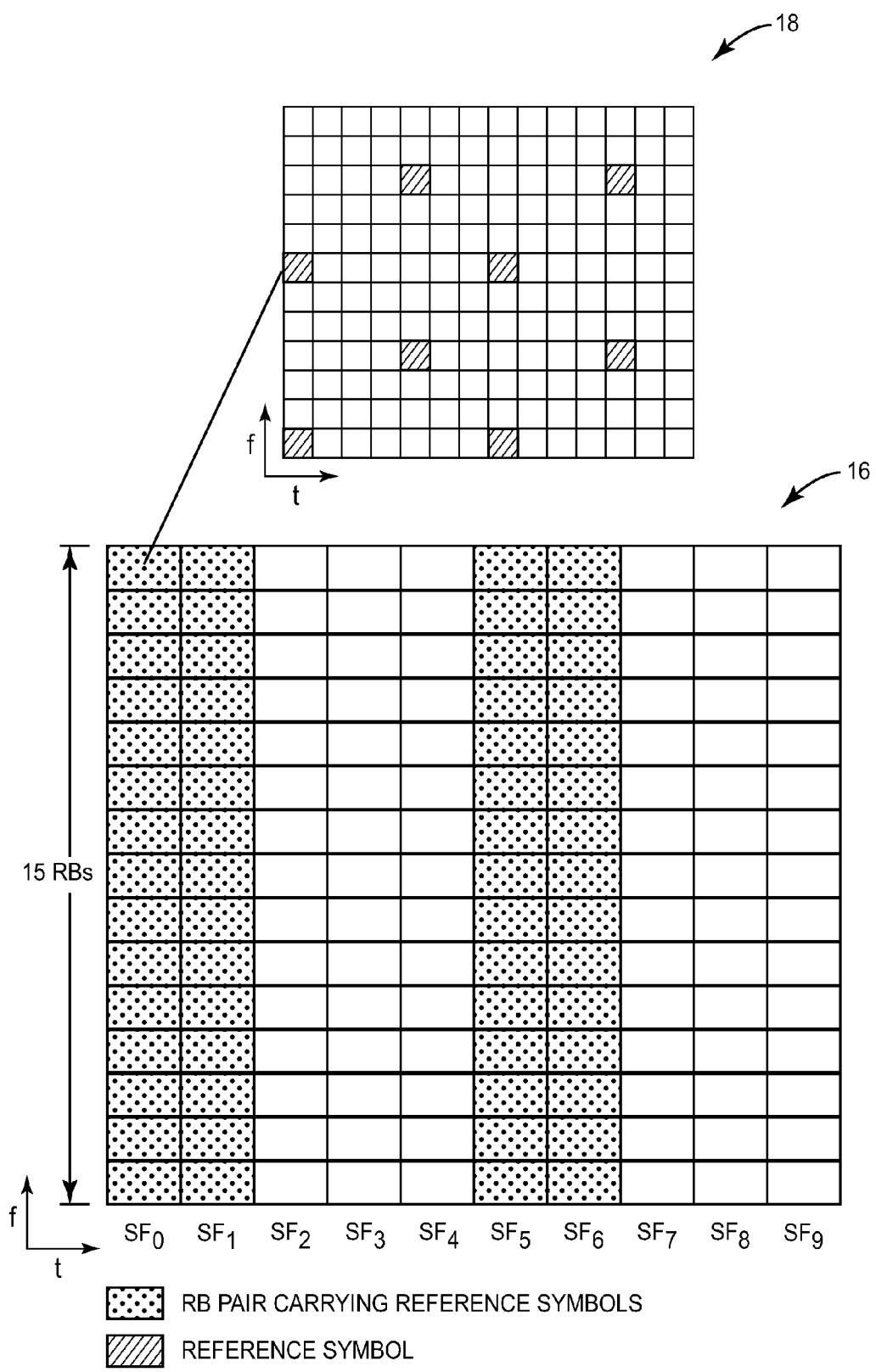
FIGS. 7 and 8 illustrate two examples of a frame of the downlink signal carrying a bandwidth adaptive reference signal according to the embodiment of FIG. 6.

FIG. 7 illustrates one example of an LTE frame 16 of the downlink signal carrying CRSs in a determined number of subframes per frame in the time dimension of the downlink signal and a determined number of RBs in the frequency dimension of the downlink signal according to the process of FIG. 6. In this example, the system bandwidth of the downlink carrier is defined as $N_{RB}=15$ RBs (i.e., 3 MHz) and the predetermined minimum number of RB pairs per half frame, is defined as $R_{MIN}=25$. As such, based on Equations 1 and 2 above, the number of subframes that carry CRSs per half frame, ($C_{SF}$) is 2, and the number of RBs in the frequency dimension of the downlink carrier that carry CRSs ($C_{RB}$) is equal to 15. Thus, as illustrated in FIG. 7, CRSs are carried in two subframes per half frame, for a total of four subframes that carry CRSs in the LTE frame 16. Specifically, in this particular embodiment, CRSs are carried in subframes $SF_0$ and $SF_1$ in the first half frame, and subframes $SF_5$ and $SF_6$ in the second half frame. Subframes $SF_0$ and $SF_5$ are the subframes that carry PSS and SSS. Further, in each of the subframes that carry CRSs, the CRSs are carried in all 15 RBs in the frequency dimension of the downlink carrier. As a result, the number of RB pairs that carry CRSs per half frame, is 30, which is greater than $R_{MIN}$, which in this example is 25. FIG. 7 also illustrates one of the RBs that carry CRSs, which is referred to as RB 18. As illustrated, the RB 18 carries CRSs in the conventional locations for antenna port 0. Likewise, the other RBs that carry CRSs in the LTE frame 16 carry the CRSs in the conventional locations for antenna port 0.

Figure 8:
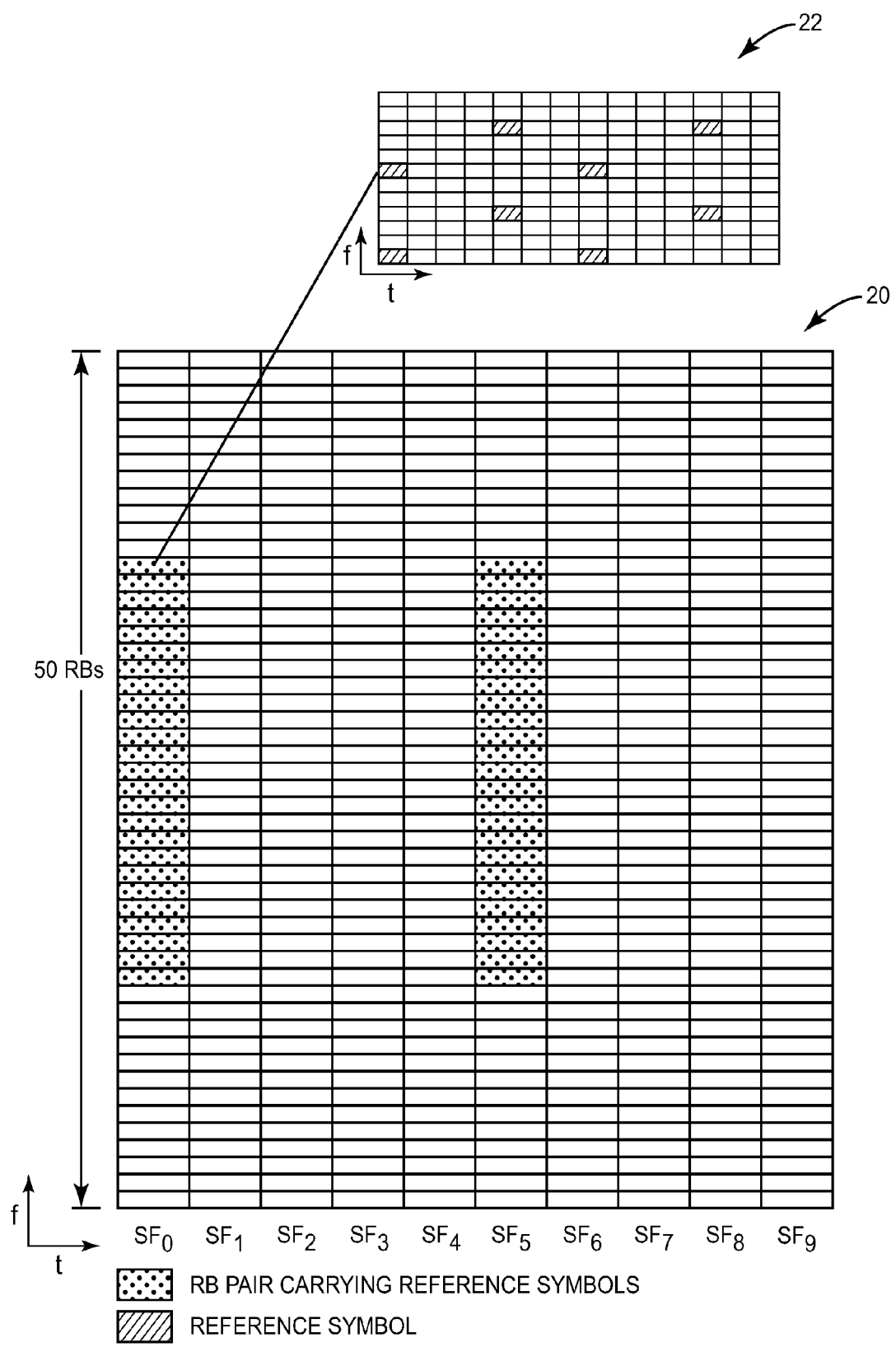

FIG. 8 illustrates another example of an LTE frame 20 carrying CRSs in a determined number of subframes per frame in the time dimension and a determined number of RBs in the frequency dimension according to the process of FIG. 6. In this example, the system bandwidth is defined as $N_{RB}=50$ RBs (i.e., 10 MHz) and the predetermined minimum number of RB pairs per half frame, is defined as $R_{MIN}=25$. As such, based on Equations 1 and 2 above, the number of subframes that carry CRSs per half frame, ($C_{SF}$) is 1, and the number of RBs in the frequency dimension of the downlink carrier that carry CRSs ($C_{RB}$) is equal to 25. Thus, as illustrated in FIG. 8, CRSs are carried in one subframe per half frame, for a total of two subframes that carry CRSs in the LTE frame 20. Specifically, in this particular embodiment, CRSs are carried in subframe $SF_0$ in the first slot, or half frame, and subframe $SF_5$ in the second slot, or half frame. Subframes $SF_0$ and $SF_5$ are the subframes that carry PSS and SSS. Further, in each of the subframes that carry CRSs, the CRSs are carried in only 25 RBs in the frequency dimension of the downlink carrier, rather than all 50 RBs in the system bandwidth of the downlink carrier. As illustrated, the 25 RBs in the frequency dimension that carry CRSs are the 25 center-most RBs in the system bandwidth. As a result, the number of RB pairs that carry CRSs per half frame, is 25, which is equal to $R_{MIN}$. FIG. 8 also illustrates one of the RBs that carry CRSs, which is referred to as RB 22. As illustrated, the RB 22 carries CRSs in the conventional locations for antenna port 0. Likewise, the other RBs that carry CRSs in the LTE frame 20 carry the CRSs in the conventional locations for antenna port 0.

Figure 9:
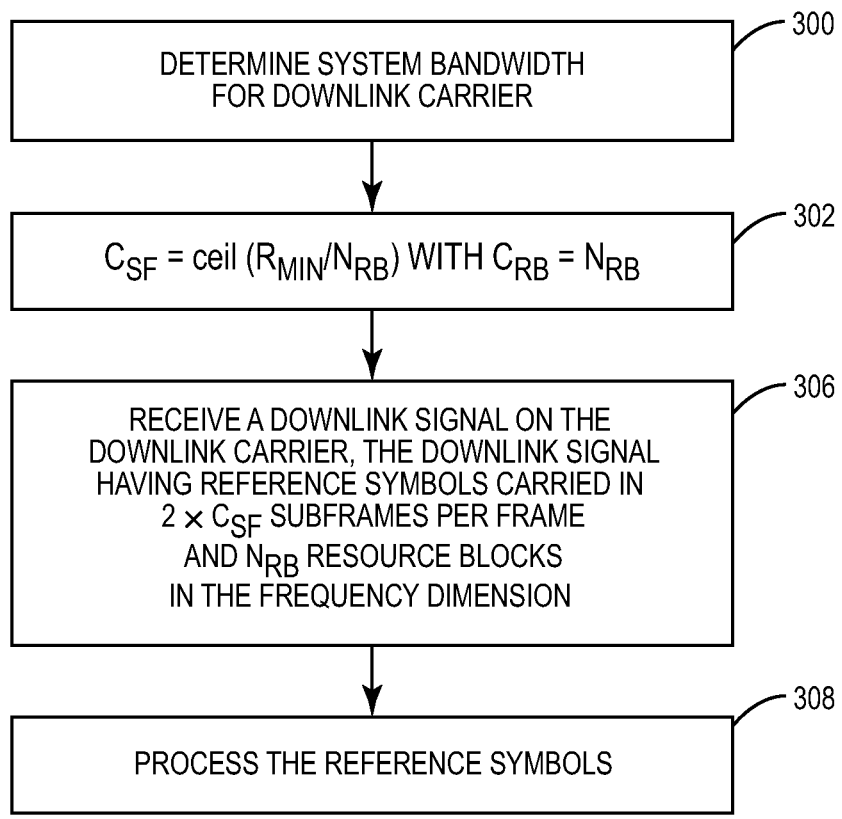
FIG. 9 is a flow chart that illustrates the operation of the wireless device of FIG. 4 to receive and process a downlink signal carrying a bandwidth adaptive reference signal according to another particular embodiment of the present disclosure.

FIG. 9 is a flow chart that illustrates the operation of the wireless device 14 of FIG. 4 according to a second particular embodiment of the present disclosure. In this embodiment, the cellular communication network 10 is an LTE network. First, the wireless device 14 determines the system bandwidth of the downlink carrier (step 300). For LTE, the system bandwidth may be expressed as a number of RBs in the frequency dimension of the downlink carrier. In one embodiment, the wireless device 14 determines the system bandwidth by receiving an indicator of the system bandwidth of the downlink carrier from the base station 12 via appropriate signaling. For LTE, the system bandwidth of the downlink carrier may be communicated to the wireless device 14 via an applicable parameter in PBCH, in a SIB, through signaling specific to the wireless device 14, or a similar higher layer signaling mechanism. In another embodiment, which is discussed below in detail, the wireless device 14 determines the system bandwidth of the downlink carrier by detecting the number of subframes or, alternatively, OFDM symbol periods that carry reference symbols per frame.

Next, the wireless device 14 determines a number of subframes ($C_{SF}$) that carry CRSs per half frame, based on, or otherwise as a function of, the system bandwidth of the downlink carrier (step 302). More specifically, in this embodiment, the number of subframes ($C_{SF}$) that carry CRSs per half frame, is defined as:

$$C_{SF} = ceil\left(\frac{R_{MIN}}{N_{RB}}\right), \quad \text{Eq. 3}$$

where ceil( ) is the ceiling function which maps a real number to the smallest following integer, $R_{MIN}$ is a predetermined minimum number of RB pairs per half frame, required to carry CRSs, and $N_{RB}$ is the system bandwidth of the downlink carrier expressed as a number of RBs. The wireless device 14 may compute $C_{SF}$ according to Equation 3, determine $C_{SF}$ using an appropriate look-up table, or the like. From Equation 3, the number of subframes that carry CRSs per frame can be expressed as $2 \cdot C_{SF}$. Similarly, a predetermined minimum number of RB pairs per frame, that are required to carry CRSs can be defined as $2 \cdot R_{MIN}$.

In this embodiment, the number of RBs in the frequency domain of the downlink carrier that carry CRSs ($C_{RB}$) is equal to the system bandwidth of the downlink carrier (i.e., $C_{RB}=N_{RB}$). Accordingly, in this embodiment, CRSs may not occupy all subframes within a frame. However, CRSs do occupy all RBs across the system bandwidth in the subframes that carry CRSs.

In this embodiment, steps 300 and 302 are programmatically performed by the wireless device 14 and may, in some embodiments, be repeated if desired. As an example, steps 300 and 302 may be performed when the wireless device 14 performs a cold start in a new cellular communication network. However, in an alternative embodiment, steps 300 and 302 are performed during design or manufacturing of the wireless device 14 such that the system bandwidth of the downlink carrier, the number of subframes that carry CRSs per half frame, and the number of RBs in the frequency dimension that carry CRSs are determined by the designer or manufacturer of the wireless device 14 and hard-coded into the wireless device 14.

Next, the wireless device 14 receives a downlink signal on the downlink carrier, where the downlink signal has CRSs carried in the determined number of subframes per half frame, per frame and the $N_{RB}$ RBs in the frequency dimension of the downlink carrier (step 304). The wireless device 14 performs one or more operations using the CRSs carried in the downlink signal (step 306). Again, the one or more operations may include, but are not limited to, time and/or frequency synchronization, channel estimation, or the like. For LTE, the one or more operations may additionally or alternatively include obtaining one or more RRM measurements using the CRSs carried in the downlink signal.

Figure 10:
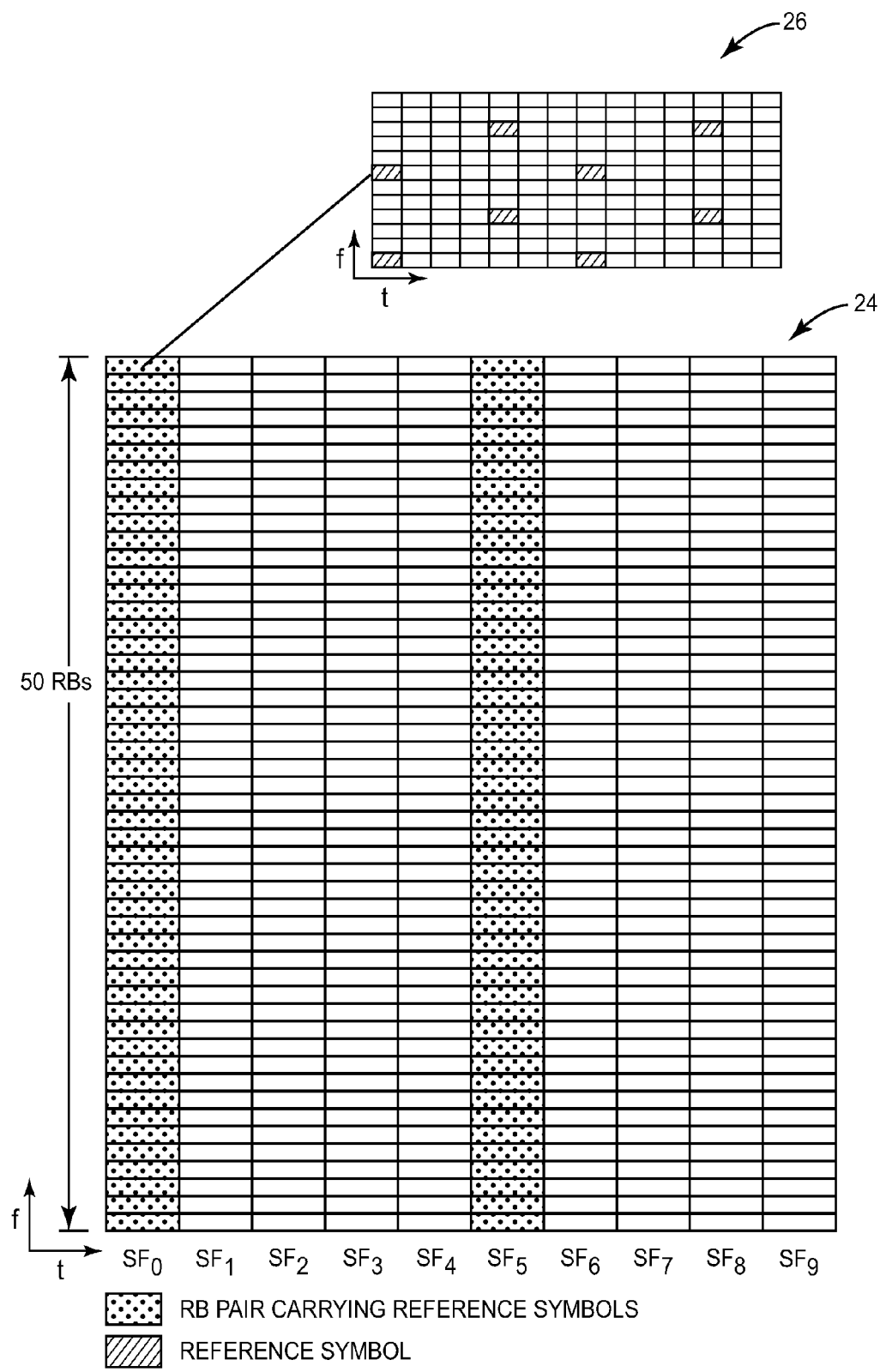
FIG. 10 illustrates an example of a frame of the downlink signal carrying a bandwidth adaptive reference signal according to the embodiment of FIG. 9.

FIG. 10 illustrates one example of an LTE frame 24 of a downlink signal carrying CRSs in a determined number of subframes per frame in the time dimension and $N_{RB}$ RBs in the frequency dimension according to the process of FIG. 9. In this example, the system bandwidth is defined as $N_{RB}=50$ RBs (i.e., 10 MHz) and the predetermined minimum number of RB pairs per half frame, is defined as $R_{MIN}=25$. As such, based on Equation 3 above, the number of subframes that carry CRSs per half frame, ($C_{SF}$) is 1, and the number of RBs in the frequency dimension of the downlink carrier that carry CRSs ($C_{RB}$) is equal to 50. Thus, as illustrated in FIG. 10, CRSs are carried in one subframe per half frame, for a total of two subframes that carry CRSs in the LTE frame 24. Specifically, in this particular embodiment, CRSs are carried in subframe $SF_0$ in the first slot, or half frame, and subframe $SF_5$ in the second slot, or half frame. Subframes $SF_0$ and $SF_5$ are the subframes that carry PSS and SSS. Further, in each of the subframes that carry CRSs, the CRSs are carried in all 50 RBs in the frequency dimension of the downlink carrier. As a result, the number of RB pairs that carry CRSs per half frame, is 50, which is greater than $R_{MIN}$, which in this example is 25. FIG. 10 also illustrates one of the RBs that carry CRSs, which is referred to as RB 26. As illustrated, the RB 26 carries CRSs in the conventional locations for antenna port 0. Likewise, the other RBs that carry CRSs in the LTE frame 24 carry the CRSs in the conventional locations for antenna port 0.

Figure 11:
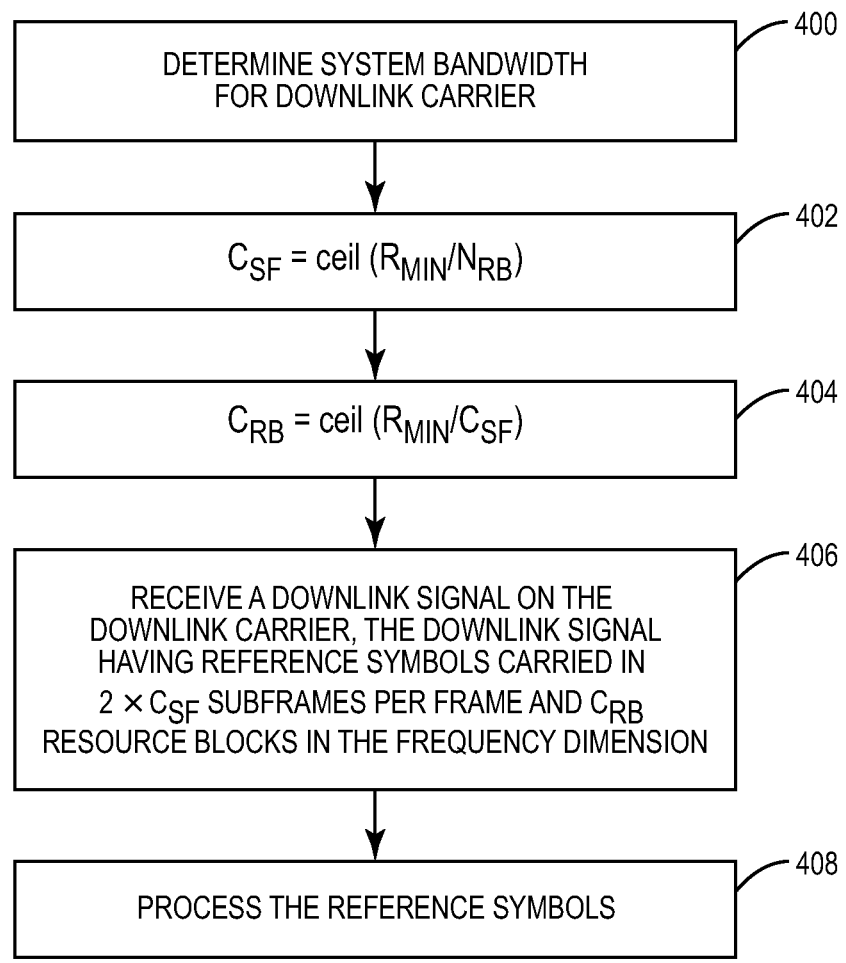
FIG. 11 is a flow chart that illustrates the operation of the wireless device of FIG. 4 to receive and process a downlink signal carrying a bandwidth adaptive reference signal according to another particular embodiment of the present disclosure.

FIG. 11 is a flow chart that illustrates the operation of the wireless device 14 of FIG. 4 according to a third particular embodiment of the present disclosure. In this embodiment, the cellular communication network 10 is an LTE network. This embodiment is similar to that of FIG. 6. However, in the embodiment of FIG. 6, if the number of subframes per half frame, that carry CRSs ($C_{SF}$) is greater than 1, then the number of RBs in the frequency dimension that carry CRSs is equal to $N_{RB}$. In contrast, in this embodiment, the number of RBs in the frequency dimension that carry CRSs ($C_{RB}$) is selected such that the number of RB pairs that carry CRSs is equal to $ceil(R_{MIN}/C_{SF})$. Thus, if multiple subframes per half frame, are allocated to carry CRSs, then the number of RBs in the frequency dimension that carry CRSs ($C_{RB}$) is a minimum number needed to provide $R_{MIN}$ RB pairs that carry CRSs per half frame.

More specifically, first, the wireless device 14 determines the system bandwidth of the downlink carrier (step 400). For LTE, the system bandwidth may be expressed as a number of RBs in the frequency dimension of the downlink carrier. In one embodiment, the wireless device 14 determines the system bandwidth by receiving an indicator of the system bandwidth of the downlink carrier from the base station 12 via appropriate signaling. For LTE, the system bandwidth of the downlink carrier may be communicated to the wireless device 14 via an applicable parameter in PBCH, in a SIB, through signaling specific to the wireless device 14, or a similar higher layer signaling mechanism. In another embodiment, which is discussed below in detail, the wireless device 14 determines the system bandwidth of the downlink carrier by detecting the number of subframes or, alternatively, OFDM symbol periods that carry reference symbols per frame.

Next, the wireless device 14 determines a number of subframes ($C_{SF}$) that carry CRSs per half frame, based on, or otherwise as a function of, the system bandwidth of the downlink carrier (step 402). More specifically, in this embodiment, the number of subframes ($C_{SF}$) that carry CRSs per half frame, is defined as:

$$C_{SF} = ceil\left(\frac{R_{MIN}}{N_{RB}}\right), \quad \text{Eq. 4}$$

where ceil( ) is the ceiling function which maps a real number to the smallest following integer, $R_{MIN}$ is a predetermined minimum number of RB pairs per half frame, required to carry CRSs, and $N_{RB}$ is the system bandwidth of the downlink carrier expressed as a number of RBs. From Equation 4, the number of subframes that carry CRSs per frame can be expressed as $2 \cdot C_{SF}$. Similarly, a predetermined minimum number of RB pairs per frame, that are required to carry CRSs can be defined as $2 \cdot R_{MIN}$.

The wireless device 14 also determines a number of RBs in the frequency domain of the downlink carrier that carry CRSs ($C_{RB}$) based on, or otherwise as a function of, the system bandwidth of the downlink carrier (step 404). More specifically, in this embodiment, the number of RBs in the frequency dimension of the downlink carrier ($C_{RB}$) that carry CRSs is defined as:

$$C_{RB} = ceil\left(\frac{R_{MIN}}{C_{SF}}\right). \quad \text{Eq. 5}$$

The wireless device 14 may compute $C_{SF}$ and $C_{RB}$ according to Equations 4 and 5, determine $C_{SF}$ and $C_{RB}$ using appropriate look-up tables, or the like. According to Equations 4 and 5, only the predetermined minimum number of RB pairs per half frame, ($R_{MIN}$) are allocated to carry CRSs. Thus, when more than one subframe carries CRSs, the CRSs occupy only a fraction of the RBs of the system bandwidth.

The RBs in the frequency dimension of the downlink carrier that carry the CRSs are preferably in the center of the system bandwidth. In one particular embodiment, the CRSs are present in at least those subframes in which PSS and SSS are transmitted. If $C_{SF}>1$, then for each slot, or half frame, an additional $C_{SF}-1$ subframes carry CRS, and these additional $C_{SF}-1$ subframes may be directly adjacent to the subframe in which PSS and SSS are transmitted, either before the subframe in which PSS and SSS are transmitted, following the subframe in which PSS and SSS are transmitted, or both. The relationship of the locations of the subframes that carry CRSs to the location of the subframe in which PSS and SSS are transmitted are preferably predefined and known to the wireless device 14. Furthermore, since there are two subframes per frame that carry PSS and SSS, there will be $2 \cdot C_{SF}$ subframes that carry CRS per frame.

In this embodiment, steps 400 through 404 are programmatically performed by the wireless device 14 and may, in some embodiments, be repeated if desired. As an example, steps 400 through 404 may be performed when the wireless device 14 performs a cold start in a new cellular communication network. However, in an alternative embodiment, steps 400 through 404 are performed during design or manufacturing of the wireless device 14 such that the system bandwidth of the downlink carrier, the number of subframes that carry CRSs per half frame, and the number of RBs in the frequency dimension that carry CRSs are determined by the designer or manufacturer of the wireless device 14 and hard-coded into the wireless device 14.

Next, the wireless device 14 receives a downlink signal on the downlink carrier, where the downlink signal has CRSs carried in the determined number of subframes per half frame, per frame and the determined number of RBs in the frequency dimension (step 406). The wireless device 14 performs one or more operations using the CRSs carried in the downlink signal (step 408). Again, the one or more operations may include, but are not limited to, time and/or frequency synchronization, channel estimation, or the like. For LTE, the one or more operations may additionally or alternatively include obtaining one or more RRM measurements using the CRSs carried in the downlink carrier.

Figure 12:
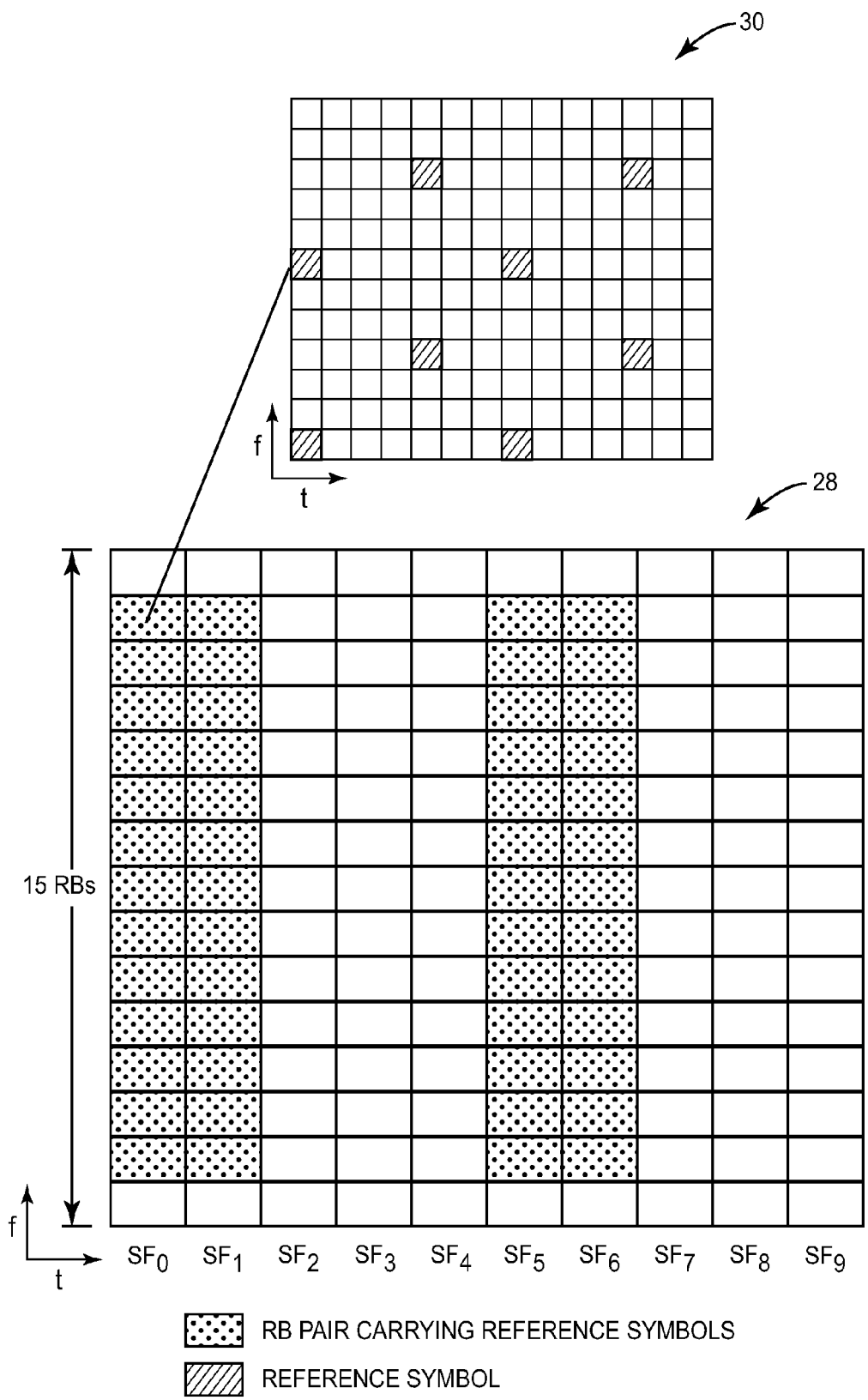
FIG. 12 illustrates an example of a frame of the downlink signal carrying a bandwidth adaptive reference signal according to the embodiment of FIG. 11.

FIG. 12 illustrates one example of an LTE frame 28 of a downlink signal carrying CRSs in a determined number of subframes per frame in the time dimension and a determined number of RBs in the frequency dimension according to the process of FIG. 11. In this example, the system bandwidth is defined as $N_{RB}=15$ RBs (i.e., 3 MHz) and the predetermined minimum number of RB pairs per half frame, is defined as $R_{MIN}=25$. As such, based on Equations 4 and 5 above, the number of subframes that carry CRSs per half frame, ($C_{SF}$) is 2, and the number of RBs in the frequency dimension of the downlink carrier that carry CRSs ($C_{RB}$) is equal to 13. Thus, as illustrated in FIG. 12, CRSs are carried in two subframes per half frame, for a total of four subframes that carry CRSs in the LTE frame 28. Specifically, in this particular embodiment, CRSs are carried in subframes $SF_0$ and $SF_1$ in the first slot, or half frame, and subframes $SF_5$ and $SF_6$ in the second slot, or half frame. Subframes $SF_0$ and $SF_5$ are the subframes that carry PSS and SSS. Further, in each of the subframes that carry CRSs, the CRSs are carried in the center-most 13 RBs in the frequency dimension of the downlink carrier. As a result, the number of RB pairs that carry CRSs per half frame, is 26, which is greater than $R_{MIN}$, which in this example is 25. FIG. 12 also illustrates one of the RBs that carry CRSs, which is referred to as RB 30. As illustrated, the RB 30 carries CRSs in the conventional locations for antenna port 0. Likewise, the other RBs that carry CRSs in the LTE frame 28 carry the CRSs in the conventional locations for antenna port 0.

Figure 13:
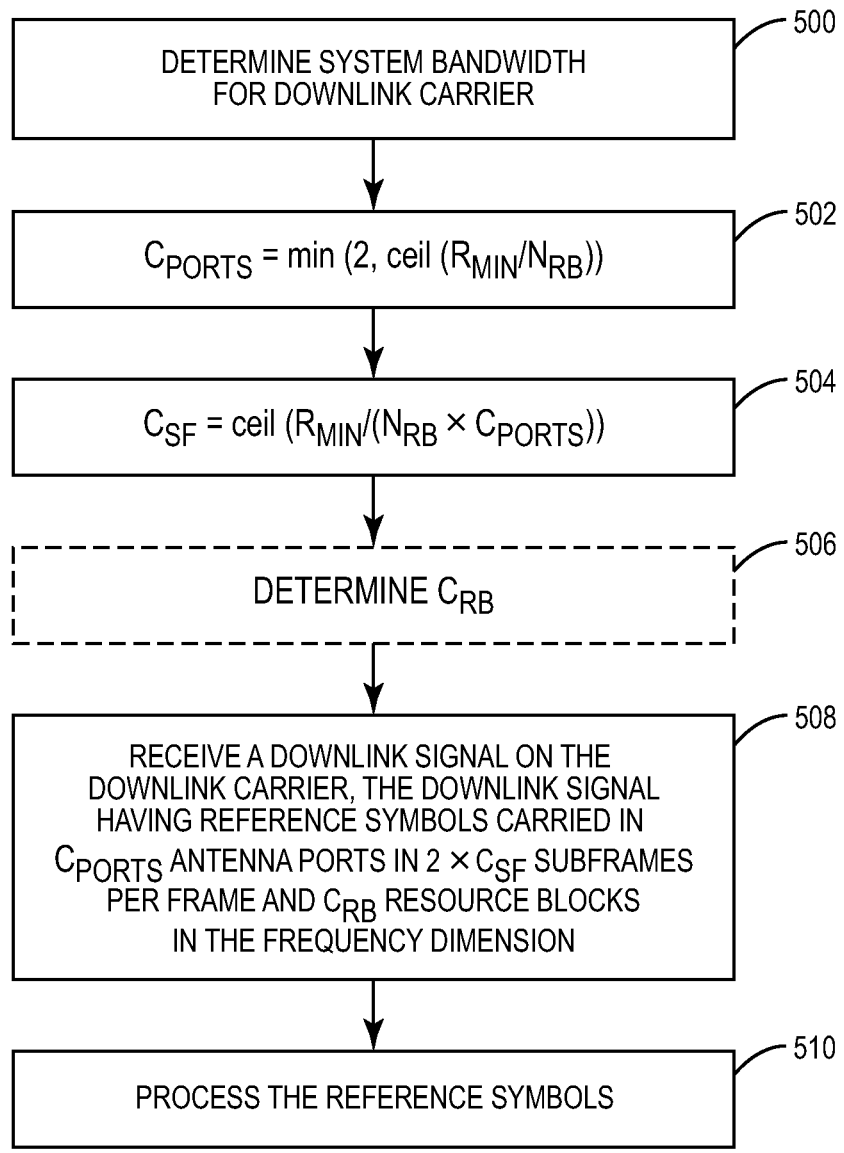
FIG. 13 is a flow chart that illustrates the operation of the wireless device of FIG. 4 to receive and process a downlink signal carrying a bandwidth adaptive reference signal according to another particular embodiment of the present disclosure.

FIG. 13 is a flow chart that illustrates the operation of the wireless device 14 of FIG. 4 according to a fourth particular embodiment of the present disclosure. In this embodiment, the cellular communication network 10 is an LTE network. This embodiment is similar to those above. However, in this embodiment, CRS locations for more than one antenna port may be used. In general, CRSs are first carried in antenna port 0 locations. If more CRSs are needed, then CRSs are carried in additional antenna port locations. Notably, the CRSs for the different antenna port locations may be transmitted by the same antenna port or different antenna ports (e.g., the same or different radios of the base station 12 or radios of different base stations).

More specifically, first, the wireless device 14 determines the system bandwidth of the downlink carrier (step 500). For LTE, the system bandwidth may be expressed as a number of RBs in the frequency dimension of the downlink carrier. In one embodiment, the wireless device 14 determines the system bandwidth by receiving an indicator of the system bandwidth of the downlink carrier from the base station 12 via appropriate signaling. For LTE, the system bandwidth of the downlink carrier may be communicated to the wireless device 14 via an applicable parameter in PBCH, in a SIB, through signaling specific to the wireless device 14, or a similar higher layer signaling mechanism. In another embodiment, which is discussed below in detail, the wireless device 14 determines the system bandwidth of the downlink carrier by detecting the number of subframes or, alternatively, OFDM symbol periods that carry reference symbols per frame.

Next, the wireless device 14 determines a number of antenna ports ($C_{PORTS}$) that carry CRSs (step 502). More specifically, the number of antenna ports ($C_{PORTS}$) is defined as:

$$C_{PORTS} = \min\left(2, ceil\left(\frac{R_{MIN}}{N_{RB}}\right)\right) \quad \text{Eq. 6}$$

where $R_{MIN}$ is a predetermined minimum number of RB pairs per half frame, required to carry CRSs, and $N_{RB}$ is the system bandwidth of the downlink carrier expressed as a number of RBs. It should be noted that Equation 6 assumes that the maximum number of antenna ports that can be used to carry CRSs is 2. However, the present disclosure is not limited thereto. The maximum number of antenna ports that may be used may be greater than 2 (e.g., 3 or 4).

The wireless device 14 then determines a number of subframes ($C_{SF}$) that carry CRSs per half frame, based on, or otherwise as a function of, the system bandwidth of the downlink carrier (step 504). More specifically, in this embodiment, the number of subframes ($C_{SF}$) that carry CRSs per half frame, is defined as:

$$C_{SF} = ceil\left(\frac{R_{MIN}}{N_{RB} \times C_{PORTS}}\right), \qquad \text{Eq. 7}$$

where ceil( ) is the ceiling function which maps a real number to the smallest following integer. From Equation 7, the number of subframes that carry CRSs per frame can be expressed as $2 \cdot C_{SF}$. Similarly, a predetermined minimum number of RB pairs per frame, that are required to carry CRSs can be defined as $2 \cdot R_{MIN}$.

In some embodiments, the wireless device 14 also determines a number of RBs in the frequency domain of the downlink carrier that carry CRSs ($C_{RB}$) based on, or otherwise as a function of, the system bandwidth of the downlink carrier (step 506). More specifically, in one embodiment, the number of RBs in the frequency dimension of the downlink carrier ($C_{RB}$) that carry CRSs is defined as:

$$C_{RB} = \min\left(N_{RB}, ceil\left(\frac{R_{MIN}}{C_{PORTS} \times C_{SF}}\right)\right). \qquad \text{Eq. 8}$$

The wireless device 14 may compute $C_{PORTS}$, $C_{SF}$, and $C_{RB}$ according to Equations 6, 7, and 8, determine $C_{PORTS}$, $C_{SF}$, and $C_{RB}$ using appropriate look-up tables configured based on Equations 6, 7, and 8, or the like.

It should be noted that Equation 8 is only one example. The number of RBs in the frequency dimension of the downlink carrier ($C_{RB}$) may otherwise be defined. For example, in another embodiment, the number of RBs in the frequency dimension of the downlink carrier ($C_{RB}$) that carry CRSs is defined as:

$$C_{RB} = N_{RB}. \qquad \text{Eq. 9}$$

In this embodiment, the wireless device 14 may compute $C_{PORTS}$, $C_{SF}$, and $C_{RB}$ according to Equations 6, 7, and 9, determine $C_{PORTS}$, $C_{SF}$, and $C_{RB}$ using appropriate look-up tables configured based on Equations 6, 7, and 9, or the like.

In yet another embodiment, the number of RBs in the frequency dimension of the downlink carrier ($C_{RB}$) that carry CRSs is defined as:

$$C_{RB} = ceil\left(\frac{R_{MIN}}{C_{PORTS} \times C_{SF}}\right). \qquad \text{Eq. 10}$$

Using Equation 10, the number of RBs in the frequency dimension that carry CRSs ($C_{RB}$) is selected such that the number of RB pairs that carry CRSs is equal to $ceil(R_{MIN}/(C_{PORTS} \times C_{SF}))$. Thus, if multiple subframes per half frame, are allocated to carry CRSs, then the number of RBs in the frequency dimension that carry CRSs ($C_{RB}$) is a minimum number needed to provide $R_{MIN}$ RB pairs that carry CRSs per half frame. In this embodiment, the wireless device 14 may compute $C_{PORTS}$, $C_{SF}$, and $C_{RB}$ according to Equations 6, 7, and 10, determine $C_{PORTS}$, $C_{SF}$, and $C_{RB}$ using appropriate look-up tables configured based on Equations 6, 7, and 10, or the like.

The RBs in the frequency dimension of the downlink carrier that carry the CRSs are preferably in the center of the system bandwidth. In one particular embodiment, the CRSs are present in at least those subframes in which PSS and SSS are transmitted. If $C_{SF} > 1$, then for each slot, or half frame, an additional $C_{SF} - 1$ subframes carry CRS, and these additional $C_{SF} - 1$ subframes may be directly adjacent to the subframe in which PSS and SSS are transmitted, either before the subframe in which PSS and SSS are transmitted, following the subframe in which PSS and SSS are transmitted, or both. The relationship of the locations of the subframes that carry CRSs to the location of the subframe in which PSS and SSS are transmitted are preferably predefined and known to the wireless device 14. Furthermore, since there are two subframes per frame that carry PSS and SSS, there will be $2 \cdot C_{SF}$ subframes that carry CRS per frame.

In this embodiment, steps 500 through 506 are programmatically performed by the wireless device 14 and may, in some embodiments, be repeated if desired. As an example, steps 500 through 506 may be performed when the wireless device 14 performs a cold start in a new cellular communication network. However, in an alternative embodiment, steps 500 through 506 are performed during design or manufacturing of the wireless device 14 such that the system bandwidth of the downlink carrier, the number of antenna ports, the number of subframes that carry CRSs per half frame, and the number of RBs in the frequency dimension that carry CRSs are determined by the designer or manufacturer of the wireless device 14 and hard-coded into the wireless device 14.

Next, the wireless device 14 receives a downlink signal on the downlink carrier, where the downlink signal has CRSs carried in the determined number of antenna ports, the determined number subframes per half frame, per frame, and the determined number of RBs in the frequency dimension (step 508). The wireless device 14 performs one or more operations using the CRSs carried in the downlink signal (step 510). Again, the one or more operations may include, but are not limited to, time and/or frequency synchronization, channel estimation, or the like. For LTE, the one or more operations may additionally or alternatively include obtaining one or more RRM measurements using the CRSs carried in the downlink carrier.

Figure 14:
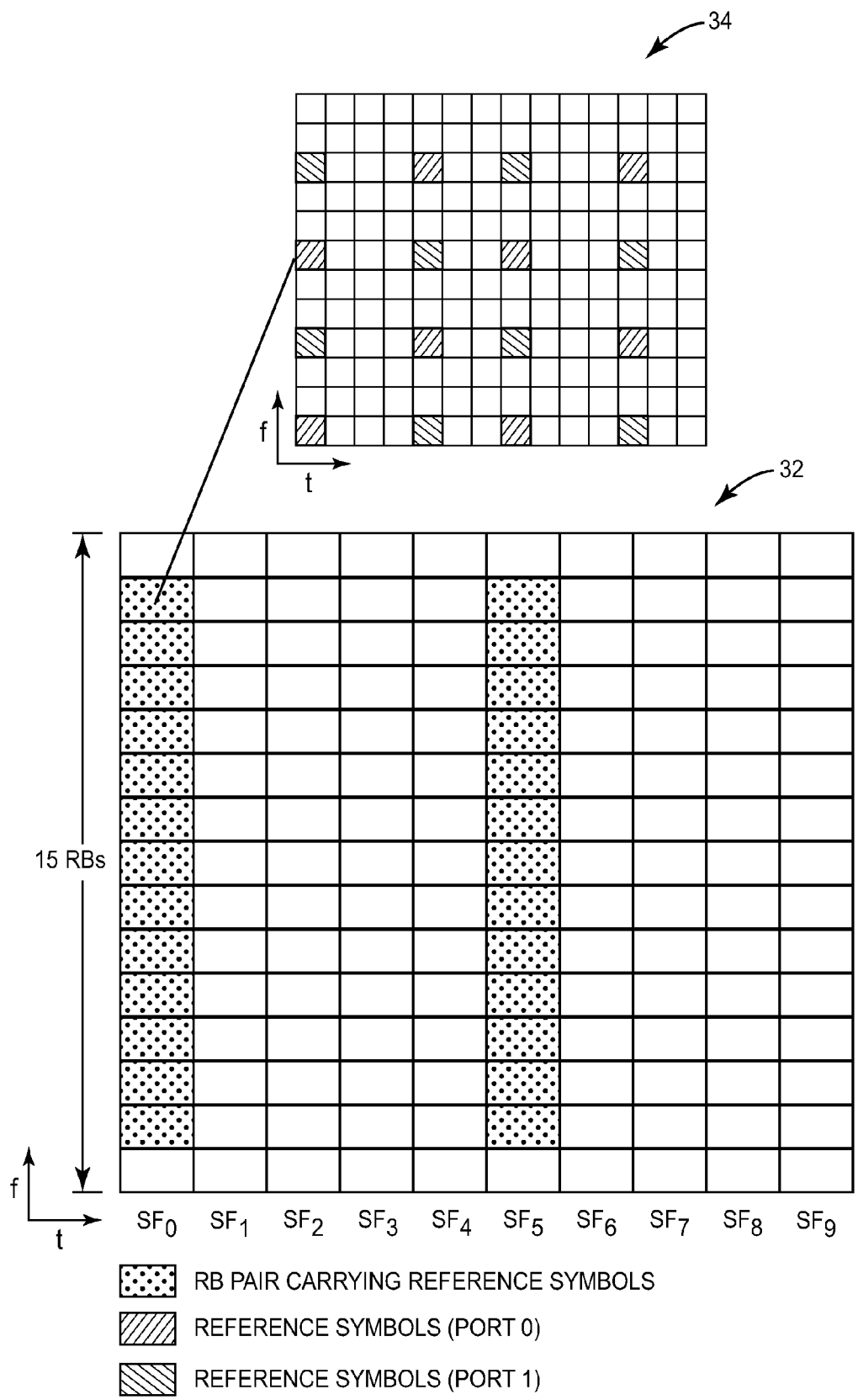
FIGS. 14 and 15 illustrate examples of a frame of the downlink signal carrying a bandwidth adaptive reference signal according to the embodiment of FIG. 13.

FIG. 14 illustrates one example of an LTE frame 32 of a downlink signal carrying CRSs in a determined number of antenna ports, a determined number of subframes per frame in the time dimension, and a determined number of RBs in the frequency dimension according to the process of FIG. 13. In this example, the system bandwidth is defined as $N_{RB} = 15$ RBs (i.e., 3 MHz) and the predetermined minimum number of RB pairs per half frame, is defined as $R_{MIN} = 25$. As such, based on Equations 6 through 8 above, the number of antenna ports that carry CRSs ($C_{PORTS}$) is 2, the number of subframes that carry CRSs per half frame, ($C_{SF}$) is 1, and the number of RBs in the frequency dimension of the downlink carrier that carry CRSs ($C_{RB}$) is equal to 13. Thus, as illustrated in FIG. 14, CRSs are carried in one subframe per half frame, for a total of two subframes that carry CRSs in the LTE frame 32. Specifically, in this particular embodiment, CRSs are carried in subframe $SF_0$ in the first slot, or half frame, and subframe $SF_5$ in the second slot, or half frame. Subframes $SF_0$ and $SF_5$ are the subframes that carry PSS and SSS. Further, in each of the subframes that carry CRSs, the CRSs are carried in the CRS locations for antenna ports 0 and 1 in the center-most 13 RBs in the frequency dimension of the downlink carrier. As a result, the number of RB pairs that carry CRSs per half frame, is 26, which is greater than $R_{MIN}$, which in this example is 25. FIG. 14 also illustrates one of the RBs that carry CRSs, which is referred to as RB 34. As illustrated, the RB 34 carries CRSs in the CRS locations for antenna port 0 and the CRS locations for antenna port 1. Likewise, the other RBs that carry CRSs in the LTE frame 32 carry the CRSs in the CRS locations for antenna port 0 and the CRS locations for antenna port 1.

Figure 15:
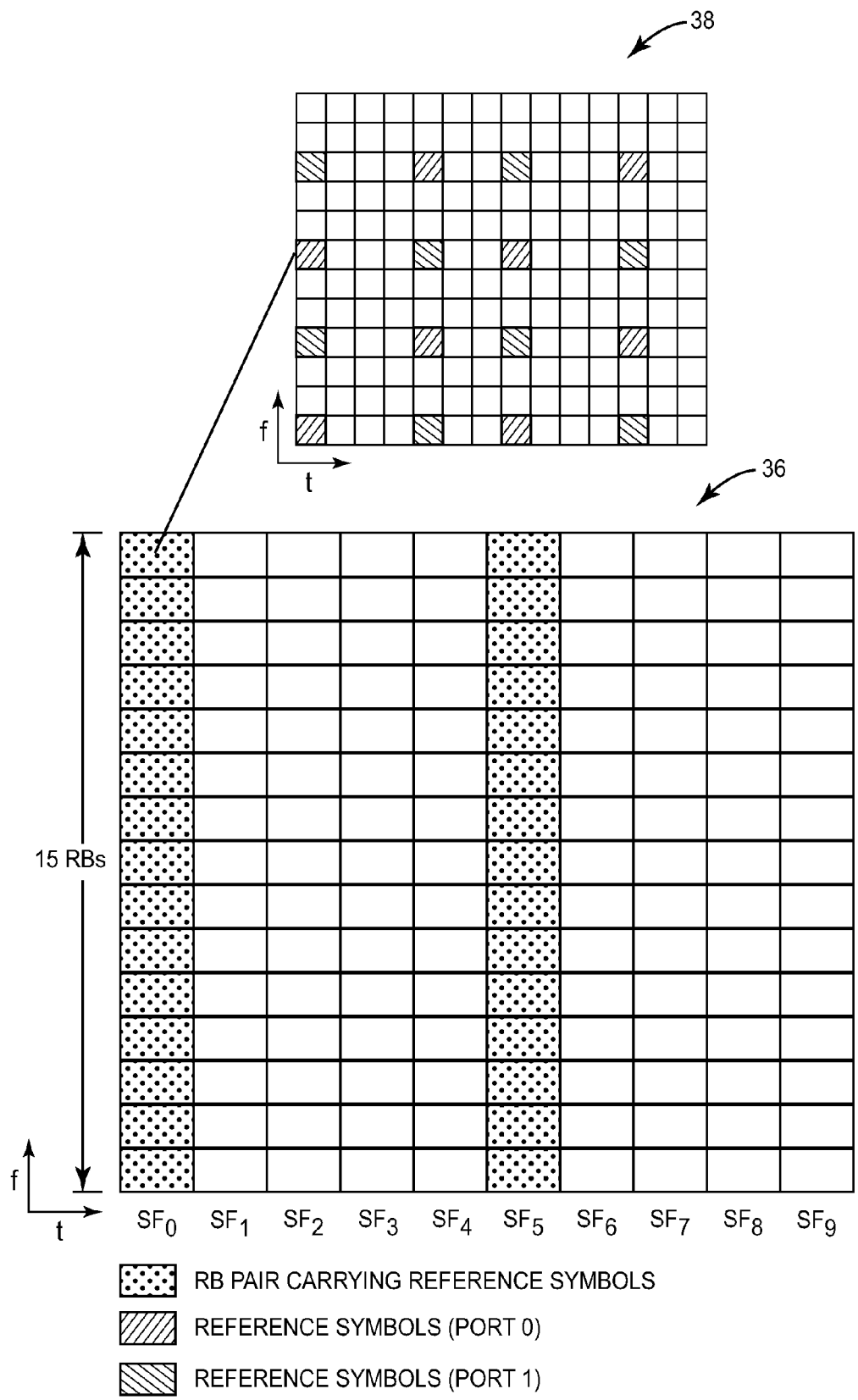

FIG. 15 illustrates one example of an LTE frame 36 for a downlink signal carrying CRSs in a determined number of antenna ports, a determined number of subframes per frame in the time dimension, and a determined number of RBs in the frequency dimension according to the process of FIG. 13. In this example, the number of RBs in the frequency dimension of the downlink carrier is defined as $C_{RB}=N_{RB}$, the system bandwidth is defined as $N_{RB}=15$ RBs (i.e., 3 MHz), and the predetermined minimum number of RB pairs per half frame, is defined as $R_{MIN}=25$. As such, based on Equations 6 and 7 above, the number of antenna ports that carry CRSs ($C_{PORTS}$) is 2, the number of subframes that carry CRSs per half frame, ($C_{SF}$) is 1, and the number of RBs in the frequency dimension of the downlink carrier that carry CRSs ($C_{RB}$) is equal to 15. Thus, as illustrated in FIG. 15, CRSs are carried in one subframe per half frame, for a total of two subframes that carry CRSs in the LTE frame 36. Specifically, in this particular embodiment, CRSs are carried in subframe $SF_0$ in the first slot, or half frame, and subframe $SF_5$ in the second slot, or half frame. Subframes $SF_0$ and $SF_5$ are the subframes that carry PSS and SSS. Further, in each of the subframes that carry CRSs, the CRSs are carried in the CRS locations for antenna ports 0 and 1 in all 15 RBs in the frequency dimension of the downlink carrier. As a result, the number of RB pairs that carry one CRS port per half frame, is 30 (since each RB has two ports of CRS), which is greater than $R_{MIN}$, which in this example is 25. FIG. 15 also illustrates one of the RBs that carry CRSs, which is referred to as RB 38. As illustrated, the RB 38 carries CRSs in the CRS locations for antenna port 0 and the CRS locations for antenna port 1. Likewise, the other RBs that carry CRSs in the LTE frame 36 carry the CRSs in the CRS locations for antenna port 0 and the CRS locations for antenna port 1.

Figure 16:
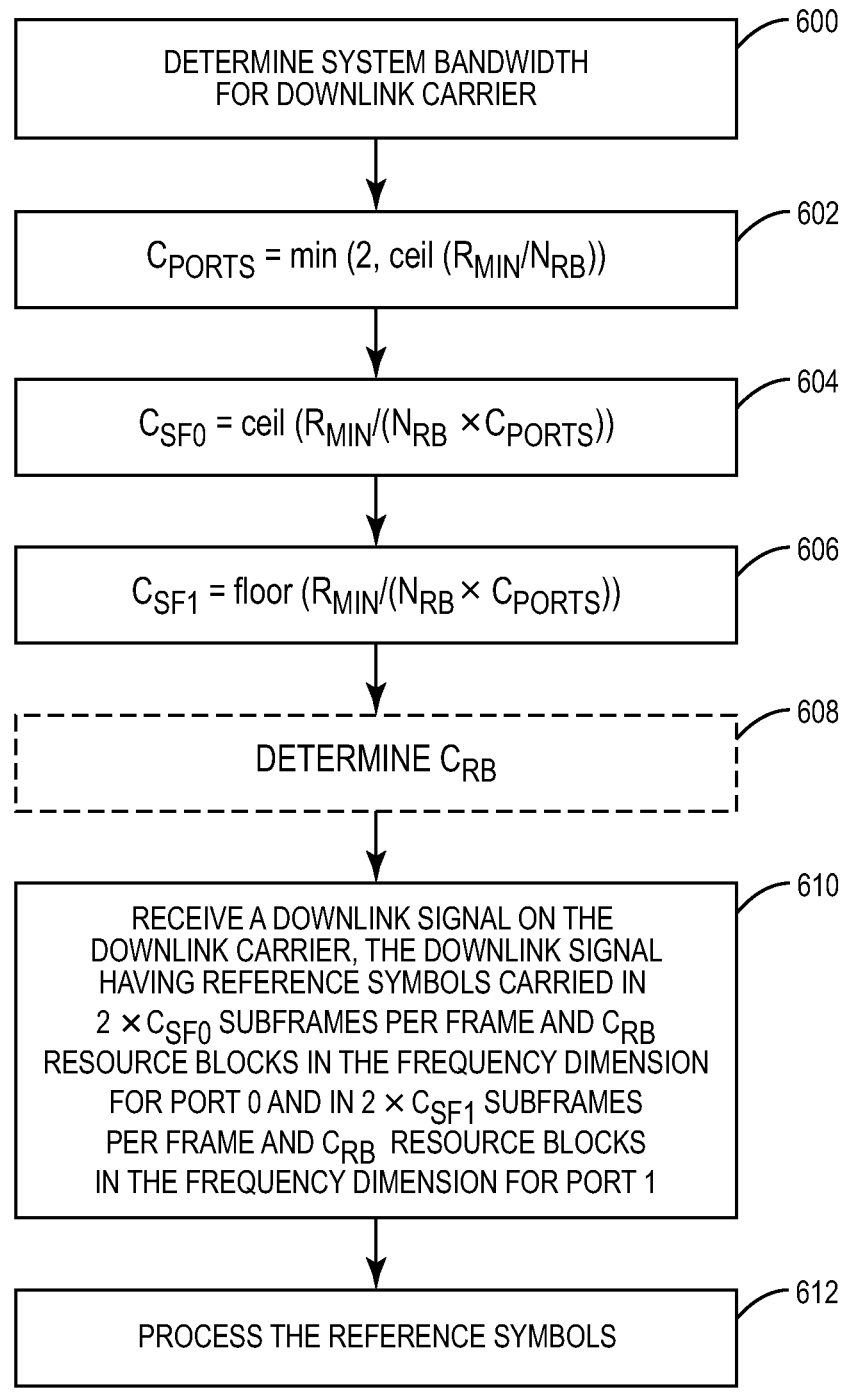
FIG. 16 is a flow chart that illustrates the operation of the wireless device of FIG. 4 to receive and process a downlink signal carrying a bandwidth adaptive reference signal according to another particular embodiment of the present disclosure.

FIG. 16 is a flow chart that illustrates the operation of the wireless device 14 of FIG. 4 according to a fourth particular embodiment of the present disclosure. In this embodiment, the cellular communication network 10 is an LTE network. This embodiment is similar to that of FIG. 13. However, in this embodiment, the number of antenna ports used to carry CRSs in different subframes may be different.

More specifically, first, the wireless device 14 determines the system bandwidth of the downlink carrier (step 600). For LTE, the system bandwidth may be expressed as a number of RBs in the frequency dimension of the downlink carrier. In one embodiment, the wireless device 14 determines the system bandwidth by receiving an indicator of the system bandwidth of the downlink carrier from the base station 12 via appropriate signaling. For LTE, the system bandwidth of the downlink carrier may be communicated to the wireless device 14 via an applicable parameter in PBCH, in a SIB, through signaling specific to the wireless device 14, or a similar higher layer signaling mechanism. In another embodiment, which is discussed below in detail, the wireless device 14 determines the system bandwidth of the downlink carrier by detecting the number of subframes or, alternatively, OFDM symbol periods that carry reference symbols per frame.

Next, the wireless device 14 determines a number of antenna ports ($C_{PORTS}$) to carry CRSs (step 602). More specifically, the number of antenna ports ($C_{PORTS}$) is defined as:

$$C_{PORTS} = \min\!\left(2, \frac{R_{MIN}}{N_{RB}}\right), \quad \text{Eq. 11}$$

where $R_{MIN}$ is a predetermined minimum number of RB pairs per half frame, required to carry CRSs, and $N_{RB}$ is the system bandwidth of the downlink carrier expressed as a number of RBs. It should be noted that Equation 11 assumes that the maximum number of antenna ports that can be used to carry CRSs is 2. However, the present disclosure is not limited thereto. The maximum number of antenna ports that may be used may be greater than 2 (e.g., 3 or 4).

The wireless device 14 then determines a number of subframes that carry CRSs per half frame, in CRS locations for antenna port 0 ($C_{SF0}$) based on, or otherwise as a function of, the system bandwidth of the downlink carrier (step 604). More specifically, in this embodiment, the number of subframes that carry CRSs per half frame, in CRS locations for antenna port 0 ($C_{SF0}$) is defined as:

$$C_{SF0} = \text{ceil}\!\left(\frac{R_{MIN}}{N_{RB} \times C_{PORTS}}\right), \quad \text{Eq. 12}$$

where ceil( ) is the ceiling function which maps a real number to the smallest following integer. From Equation 12, the number of subframes that carry CRSs per frame in CRS locations for antenna port 0 can be expressed as $2 \cdot C_{SF0}$. Similarly, a predetermined minimum number of RB pairs per frame, that are required to carry CRSs can be defined as $2 \cdot R_{MIN}$.

The wireless device 14 also determines a number of subframes that carry CRSs per half frame, in CRS locations for antenna port 1 ($C_{SF1}$) based on, or otherwise as a function of, the system bandwidth of the downlink carrier (step 606). More specifically, in this embodiment, the number of subframes that carry CRSs per half frame, in CRS locations for antenna port 1 ($C_{SF1}$) is defined as:

$$C_{SF1} = \text{floor}\!\left(\frac{R_{MIN}}{N_{RB} \times C_{PORTS}}\right), \quad \text{Eq. 13}$$

where floor( ) is the floor function which maps a real number to the largest preceding integer. From Equation 13, the number of subframes that carry CRSs per frame in CRS locations for antenna port 1 can be expressed as $2 \cdot C_{SF1}$.

In some embodiments, the wireless device 14 also determines a number of RBs in the frequency domain of the downlink carrier that carry CRSs ($C_{RB}$) based on, or otherwise as a function of, the system bandwidth of the downlink carrier (step 608). More specifically, in one embodiment, the number of RBs in the frequency dimension of the downlink carrier ($C_{RB}$) that carry CRSs is defined as in Equation 9. In other embodiments, Equations 8 or 10 may be used. The wireless device 14 may compute $C_{PORTS}$, $C_{SF0}$, $C_{SF1}$, and $C_{RB}$ according to Equations 11, 12, 13, and 9, determine $C_{PORTS}$, $C_{SF}$, and $C_{RB}$ using appropriate look-up tables configured based on Equations 11, 12, 13, and 9, or the like.

The RBs in the frequency dimension of the downlink carrier that carry the CRSs are preferably in the center of the system bandwidth. In one particular embodiment, the CRSs are present in at least those subframes in which PSS and SSS are transmitted. If $C_{SF}>1$, then for each slot, or half frame, an additional $C_{SF}-1$ subframes carry CRS, and these additional $C_{SF}-1$ subframes may be directly adjacent to the subframe in which PSS and SSS are transmitted, either before the subframe in which PSS and SSS are transmitted, following the subframe in which PSS and SSS are transmitted, or both. The relationship of the locations of the subframes that carry CRSs to the location of the subframe in which PSS and SSS are transmitted are preferably predefined and known to the wireless device 14. Furthermore, since there are two subframes per frame that carry PSS and SSS, there will be $2 \cdot C_{SF}$ subframes that carry CRS per frame.

In this embodiment, steps 600 through 608 are programmatically performed by the wireless device 14 and may, in some embodiments, be repeated if desired. As an example, steps 600 through 608 may be performed when the wireless device 14 performs a cold start in a new cellular communication network. However, in an alternative embodiment, steps 600 through 608 are performed during design or manufacturing of the wireless device 14 such that the system bandwidth of the downlink carrier, the number of antenna ports, the number of subframes that carry CRSs per half frame for each different antenna port, and the number of RBs in the frequency dimension that carry CRSs are determined by the designer or manufacturer of the wireless device 14 and hard-coded into the wireless device 14.

Next, the wireless device 14 receives a downlink signal on the downlink carrier, where the downlink signal has CRSs carried in the determined number of antenna ports, the determined number subframes per half frame, per frame for each different antenna port, and the determined number of RBs in the frequency dimension (step 610). The wireless device 14 performs one or more operations using the CRSs carried in the downlink signal (step 612). Again, the one or more operations may include, but are not limited to, time and/or frequency synchronization, channel estimation, or the like. For LTE, the one or more operations may additionally or alternatively include obtaining one or more RRM measurements using the CRSs carried in the downlink carrier.

Figure 17:
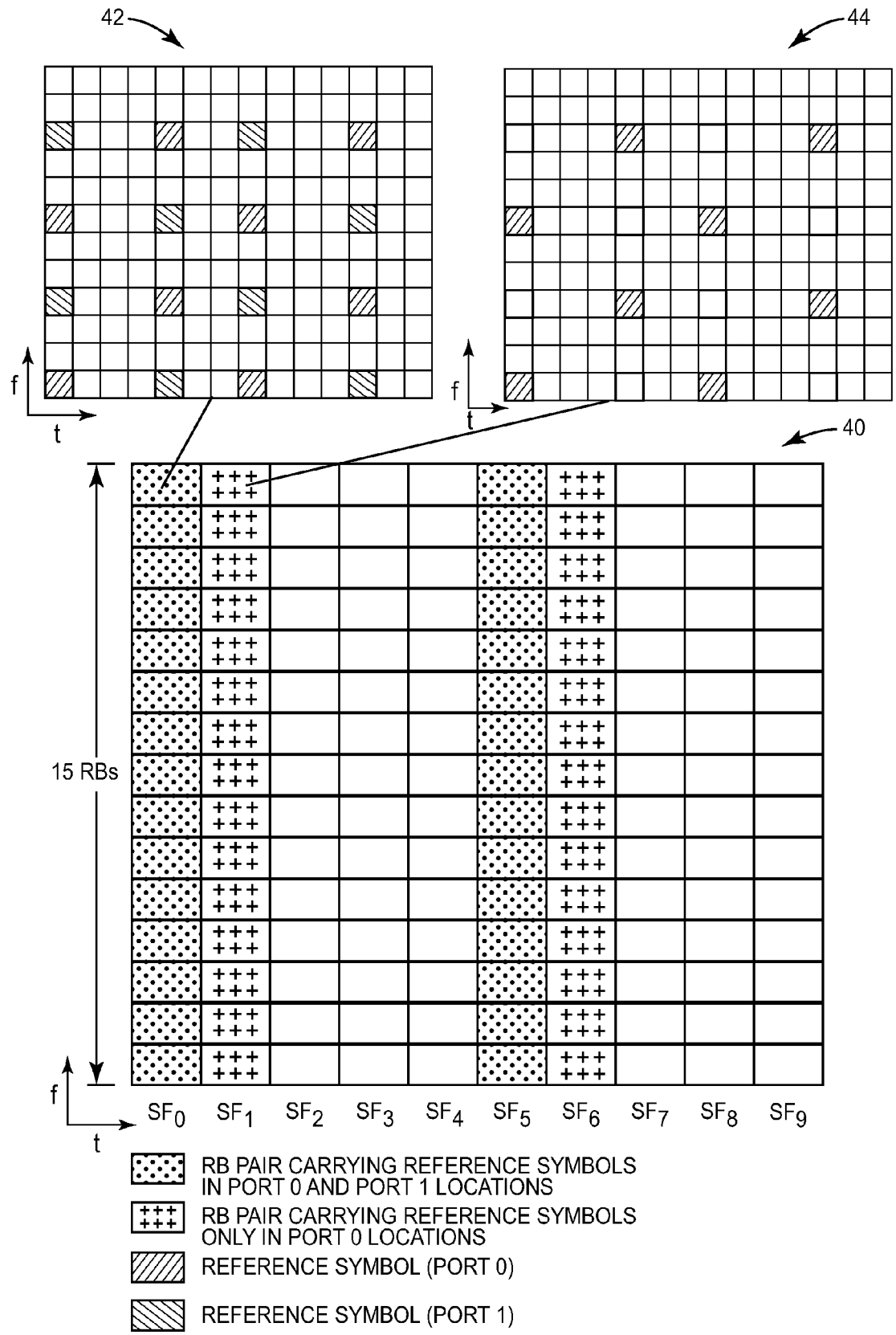
FIG. 17 illustrates an example of a frame of the downlink signal carrying a bandwidth adaptive reference signal according to the embodiment of FIG. 16.

FIG. 17 illustrates one example of an LTE frame 40 carrying CRSs in a determined number of antenna ports, a determined number of subframes per frame in the time dimension for each different subframe, and a determined number of RBs in the frequency dimension according to the process of FIG. 16. In this example, $C_{RB}$ is defined as being equal to $N_{RB}$. However, the present disclosure is not limited thereto. Further, in this example, the system bandwidth is defined as $N_{RB}=15$ RBs (i.e., 3 MHz) and the predetermined minimum number of RB pairs per half frame, is defined as $R_{MIN}=35$. As such, based on Equations 11 through 13 above, the number of antenna ports that carry CRSs ($C_{PORTS}$) is 2, the number of subframes that carry CRSs per half frame, in CRS locations for antenna port 0 ($C_{SF0}$) is 2, the number of subframes that carry CRSs per half frame, in CRS locations for antenna port 1 ($C_{SF1}$) is equal to 1, and the number of RBs in the frequency dimension of the downlink carrier that carry CRSs ($C_{RB}$) is equal to 15. Thus, as illustrated in FIG. 17, CRSs are carried in two subframes per half frame, for a total of four subframes that carry CRSs in the LTE frame 40. Specifically, in this particular embodiment, CRSs in locations for antenna port 0 are carried in subframes $SF_0$ and $SF_1$ in the first half frame, and subframes $SF_5$ and $SF_6$ in the second half frame. CRSs in locations for antenna port 1 are carried in subframe $SF_0$ in the first half frame, and subframe $SF_5$ in the second half frame. Subframes $SF_0$ and $SF_5$ are the subframes that carry PSS and SSS. As a result, the number of RB pairs that carry one CRS port per half frame, is 45 (since RBs in the first subframe carry two CRS ports and RBs in the second subframe carry one CRS port), which is greater than $R_{MIN}$, which in this example is 35. FIG. 17 also illustrates one of the RBs that carry CRSs in the locations for antenna ports 0 and 1, which is referred to as RB 42, and one of the RBs that carry CRSs in only the locations for antenna port 0, which is referred to as RB 44.

Figure 18:
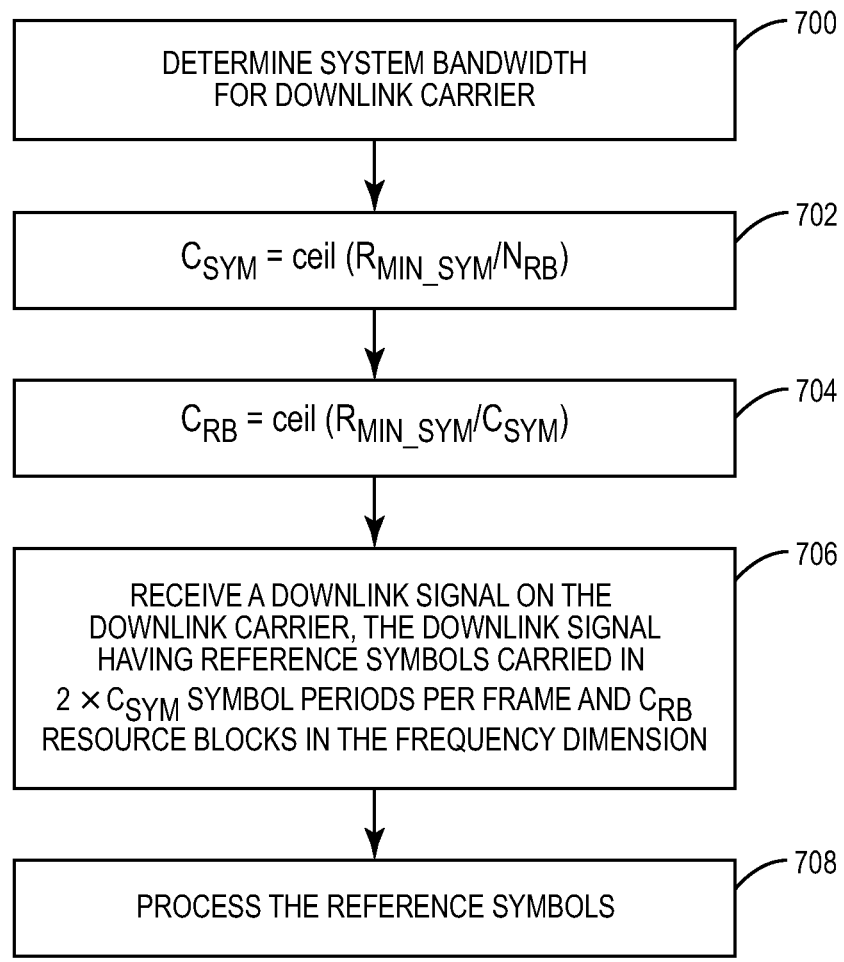
FIG. 18 is a flow chart that illustrates the operation of the wireless device of FIG. 4 to receive and process a downlink signal carrying a bandwidth adaptive reference signal according to another particular embodiment of the present disclosure.

FIG. 18 is a flow chart that illustrates the operation of the wireless device 14 of FIG. 4 according to a sixth particular embodiment of the present disclosure. In general, while many of the embodiments described above utilize subframes as the time domain unit, the present disclosure is not limited thereto. Alternatively, an OFDM symbol period may be used as the time domain unit. The particular embodiment of FIG. 18 is similar to that of FIG. 6, but where the time domain unit is an OFDM symbol period rather than a subframe.

First, the wireless device 14 determines the system bandwidth of the downlink carrier (step 700). For LTE, the system bandwidth may be expressed as a number of RBs in the frequency dimension of the downlink carrier. In one embodiment, the wireless device 14 determines the system bandwidth by receiving an indicator of the system bandwidth of the downlink carrier from the base station 12 via appropriate signaling. For LTE, the system bandwidth of the downlink carrier may be communicated to the wireless device 14 via an applicable parameter in PBCH, in a SIB, through signaling specific to the wireless device 14, or similar higher layer signaling mechanism. In another embodiment, which is discussed below in detail, the wireless device 14 determines the system bandwidth of the downlink carrier by detecting the number of subframes or, alternatively, OFDM symbol periods that carry reference symbols per frame.

Next, the wireless device 14 determines a number of OFDM symbol periods ($C_{SYM}$) that carry one CRS port per half frame, based on, or otherwise as a function of, the system bandwidth of the downlink carrier (step 702). More specifically, in this embodiment, the number of OFDM symbol periods ($C_{SYM}$) that carry CRSs per half frame, is defined as:

$$C_{SYM} = ceil\left(\frac{R_{MIN\_SYM}}{N_{RB}}\right),  \quad \text{Eq. 14}$$

where $R_{MIN\_SYM}$ represents a predetermined minimum number of 1 RB×1 OFDM symbol period units that are to carry one CRS port in a half frame. Since one antenna port of CRSs in one subframe uses 4 OFDM symbol periods, in order to obtain the same number of CRSs, $R_{MIN\_SYM}$ is defined as:

$$R_{MIN\_SYM} = R_{MIN} \times 4.  \quad \text{Eq. 15}$$

From Equation 15, the number of OFDM symbol periods that carry CRSs per frame can be expressed as $2 \cdot C_{SYM}$. Similarly, a predetermined minimum number of 1 RB×1 OFDM symbol period units that are required to carry one CRS per frame can be defined as $2 \cdot R_{MIN\_SYM}$.

The wireless device 14 also determines a number of RBs in the frequency domain of the downlink carrier that carry CRSs ($C_{RB}$) based on, or otherwise as a function of, the system bandwidth of the downlink carrier (step 704). More specifically, in this embodiment, the number of RBs in the frequency dimension of the downlink carrier ($C_{RB}$) that carry CRSs is defined as:

$$C_{RB} = ceil\left(\frac{R_{MIN\_SYM}}{C_{SYM}}\right).\qquad \text{Eq. 16}$$

According to Equations 14 through 16, CRSs may not occupy all RBs in the time and frequency dimensions of the downlink carrier. The wireless device 14 may compute $C_{SYM}$ and $C_{RB}$ according to Equations 14 and 16, determine $C_{SYM}$ and $C_{RB}$ using appropriate look-up tables, or the like.

The RBs in the frequency dimension of the downlink carrier that carry the CRSs are preferably in the center of the system bandwidth. In one particular embodiment, the CRSs are present in at least OFDM symbol periods in subframes in which PSS and SSS are transmitted. If $C_{SYM}>4$, then for each half frame, an additional $C_{SYM}-4-1$ OFDM symbol periods carry CRS, and these additional $C_{SYM}-4-1$ OFDM symbol periods may be in subframes directly adjacent to the subframe in which PSS and SSS are transmitted, either before the subframe in which PSS and SSS are transmitted, following the subframe in which PSS and SSS are transmitted, or both. The relationship of the locations of the OFDM symbol periods that carry CRSs to the location of the subframe in which PSS and SSS are transmitted are preferably predefined and known to the wireless device 14.

In this embodiment, steps 700 through 704 are programmatically performed by the wireless device 14 and may, in some embodiments, be repeated if desired. As an example, steps 700 through 704 may be performed when the wireless device 14 performs a cold start in a new cellular communication network. However, in an alternative embodiment, steps 700 through 704 are performed during design or manufacturing of the wireless device 14 such that the system bandwidth of the downlink carrier, the number of OFDM symbol periods that carry one CRS port per half frame, and the number of RBs in the frequency dimension that carry CRSs are determined by the designer or manufacturer of the wireless device 14 and hard-coded into the wireless device 14.

Next, the wireless device 14 receives a downlink signal on the downlink carrier, where the downlink signal has CRSs carried in the determined number of OFDM symbol periods per half frame, and the determined number of RBs in the frequency dimension (step 706). The wireless device 14 performs one or more operations using the CRSs carried in the downlink signal (step 708). Again, the one or more operations may include, but are not limited to, time and/or frequency synchronization, channel estimation, or the like. For LTE, the one or more operations may additionally or alternatively include obtaining one or more RRM measurements using the CRSs carried in the downlink carrier.

Figure 19:
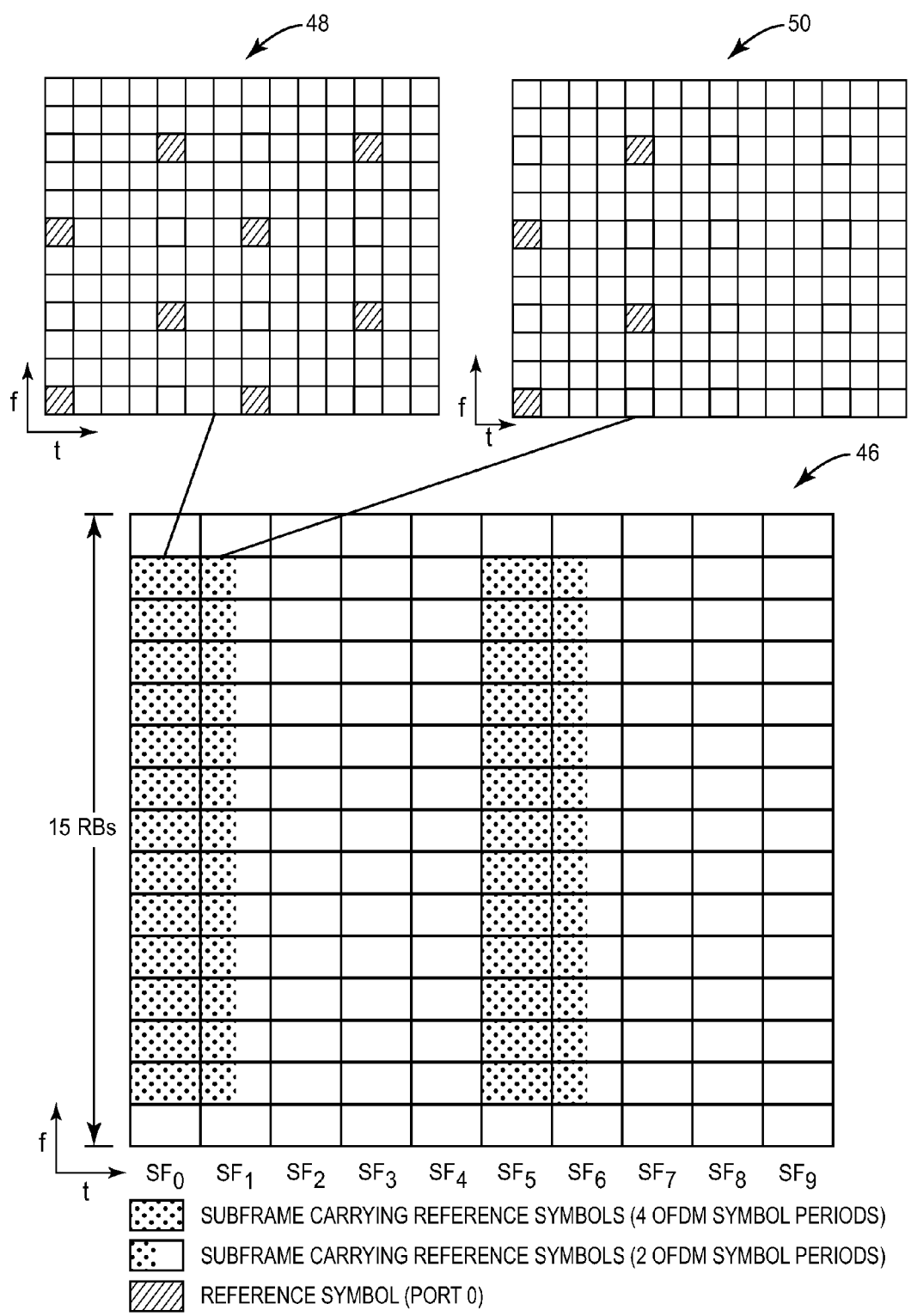
FIG. 19 illustrates an example of a frame of the downlink signal carrying a bandwidth adaptive reference signal according to the embodiment of FIG. 18.

FIG. 19 illustrates one example of an LTE frame 46 of a downlink signal carrying CRSs in a determined number of OFDM symbol periods per frame in the time dimension and a determined number of RBs in the frequency dimension according to the process of FIG. 18. In this example, the system bandwidth is defined as $N_{RB}=15$ RBs (i.e., 3 MHz) and $R_{MIN\_SYM}=78$. As such, the number of OFDM symbol periods that carry CRSs per half frame, ($C_{SYM}$) is 6, and the number of RBs in the frequency dimension of the downlink carrier that carry CRSs ($C_{RB}$) is equal to 13. Thus, as illustrated in FIG. 19, CRSs are carried in 6 OFDM symbol periods per half frame (i.e., CRSs are carried in 1.5 subframes per half frame), for a total of 12 OFDM symbol periods that carry CRSs in the LTE frame 46. Specifically, in this particular embodiment, CRSs are carried in the four OFDM symbol periods of subframe $SF_0$ and two OFDM symbol periods of subframe $SF_1$ in the first half frame. Likewise, CRSs are carried in the four OFDM symbol periods of subframe $SF_5$ and two OFDM symbol periods of subframe $SF_6$ in the second half frame. Subframes $SF_0$ and $SF_5$ are the subframes that carry PSS and SSS. Further, CRSs are carried in the center-most 13 RBs in the frequency dimension of the downlink carrier. As a result, the number of 1 OFDM symbol period×1 RB units that carry 1 CRS port per half frame, is 78, which is equal to $R_{MIN\_SYM}$, which in this example is also 78.

FIG. 19 also illustrates one of the RBs that carry CRSs in four OFDM symbol periods, which is referred to as RB 48. As illustrated, the RB 48 carries CRSs in the conventional locations for antenna port 0. Likewise, the other RBs that carry CRSs in four OFDM symbol periods in the LTE frame 46 carry the CRSs in the conventional locations for antenna port 0. In contrast, FIG. 19 illustrates ones of the RBs that carry CRSs in only two of the four possible OFDM symbol periods, which is referred to as RB 50. As illustrated, the RB 50 carries CRSs in only two of the four conventional locations for antenna port 0. Likewise, the other RBs that carry CRSs in two OFDM symbol periods in the LTE frame 46 carry the CRSs in only two of the four conventional locations for antenna port 0.

Figure 20:
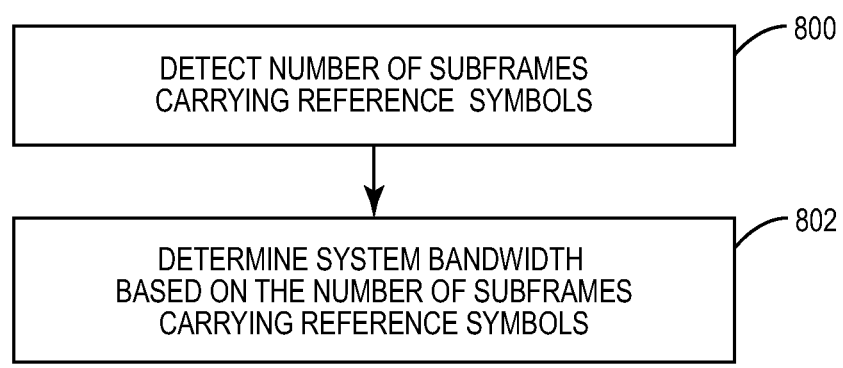
FIG. 20 is a flow chart that illustrates a process by which the wireless device can determine a system bandwidth of the downlink signal according to one embodiment of the present disclosure.

FIG. 20 is a flow chart that illustrates the operation of the wireless device 14 to determine the system bandwidth of the downlink carrier according to one embodiment of the present disclosure. First, the wireless device 14 detects a number of subframes carrying CRSs per half frame, in a downlink signal received from the base station 12 via the downlink carrier of the base station (step 800). Note that while subframes are referred to in this embodiment, OFDM symbol periods may alternatively be used. Once the number of subframes has been detected, the wireless device 14 determines the system bandwidth of the downlink carrier based on the number of subframes carrying CRSs (step 802). More specifically, the wireless device 14 has knowledge of a predefined relationship between the number of subframes that carry CRSs per half frame, and the system bandwidth of the downlink carrier. For example, the wireless device 14 may store a look-up table that correlates the detected number of subframes to a corresponding system bandwidth.

Table 1 below illustrates one example of a predefined relationship between the detected number of subframes and the system bandwidth of the downlink carrier. Note, however, the relationship illustrated in Table 1 is only one example and is not intended to limit the scope of the present disclosure.

| Number of subframes with CRS detected: $C_{SF}$ | System bandwidth in $RB_S$ (estimate of $N_{RB}$) |
|---|---|
| 5 | 6 |
| 2 | 15 |
| 1 | 25 or more |

Figure 21:
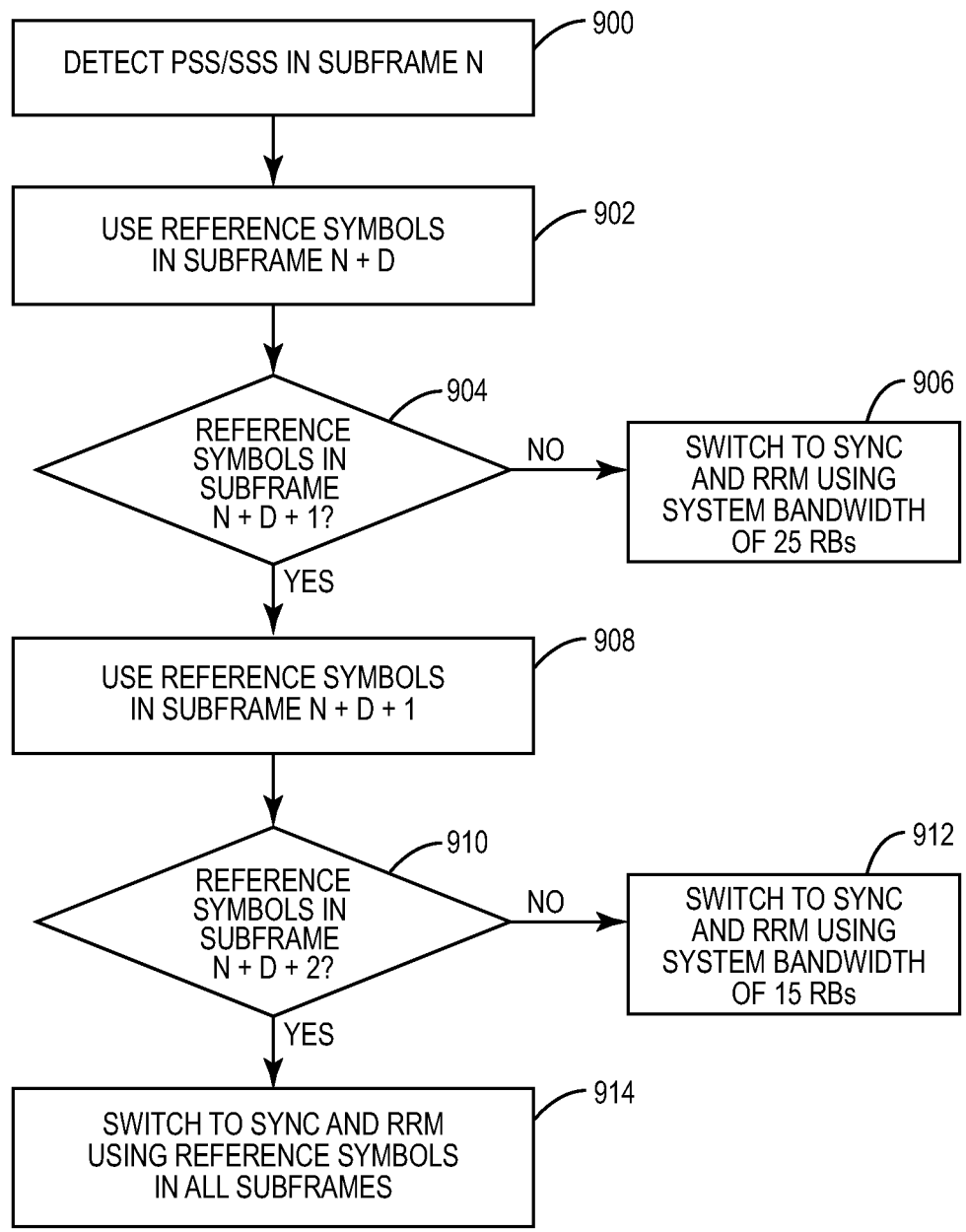
FIG. 21 is a flow chart that illustrates a process by which the wireless device can determine a system bandwidth of the downlink signal according to another embodiment of the present disclosure.

FIG. 21 is a flow chart that illustrates the operation of the wireless device 14 to determine the system bandwidth of the downlink carrier according to another embodiment of the present disclosure. In this embodiment, in each frame of the downlink signal received on the downlink carrier, at least the subframes at an offset D from subframes carrying PSS and SSS also carry CRSs. The offset D may be any integer greater than or equal to 0. Based on this knowledge, the wireless device 14 first detects PSS and SSS in subframe N using known techniques (step 900). Since the subframe N carries PSS and SSS, the wireless device 14 knows that subframe N+D also carries CRSs. As such, the wireless device 14 uses CRSs in subframe N+D to, for example, to perform one or more operations (step 902). Notably, since at this point the wireless device 14 has not yet determined the system bandwidth, the wireless device 14 may, for example, use CRSs in the minimum possible system bandwidth, which currently for LTE is 6 RBs.

Next, the wireless device 14 determines whether CRSs are detected in subframe N+D+1 (step 904). If not, the wireless device 14 knows that at least a predefined minimum number of CRSs are transmitted in only one subframe per half frame. As such, in this particular example, the wireless device 14 determines that the system bandwidth is 25 RBs and therefore switches to synchronization and RRM measurements using a system bandwidth of 25 RBs (step 906). Returning to step 904, if CRSs are detected in subframe N+D+1, then the wireless device 14 uses the CRSs in subframe N+D+1 for synchronization and RRM measurements (step 908).

Next, the wireless device 14 determines whether CRSs are detected in subframe N+D+2 (step 910). If not, the wireless device 14 knows that at least a predefined minimum number of CRSs are transmitted in two subframes per half frame. As such, in this particular example, the wireless device 14 determines that the system bandwidth is 15 RBs and therefore switches to synchronization and RRM measurements using a system bandwidth of 15 RBs (step 912). Returning to step 910, if CRSs are detected in subframe N+D+2, the wireless device 14 determines that the system bandwidth is 6 RBs and therefore switches to synchronization and RRM measurements using all subframes and all of the system bandwidth (step 914). It should be noted that the process of FIG. 21 is only an example of how the number of subframes that carry CRSs per half frame, can be detected and used to determine the system bandwidth. Numerous variations to the process of FIG. 21 will be readily apparent to one of ordinary skill in the art upon reading this disclosure. These variations include, but are not limited to, the correlation between the number of subframes that carry CRSs and the system bandwidth.

Figure 22:
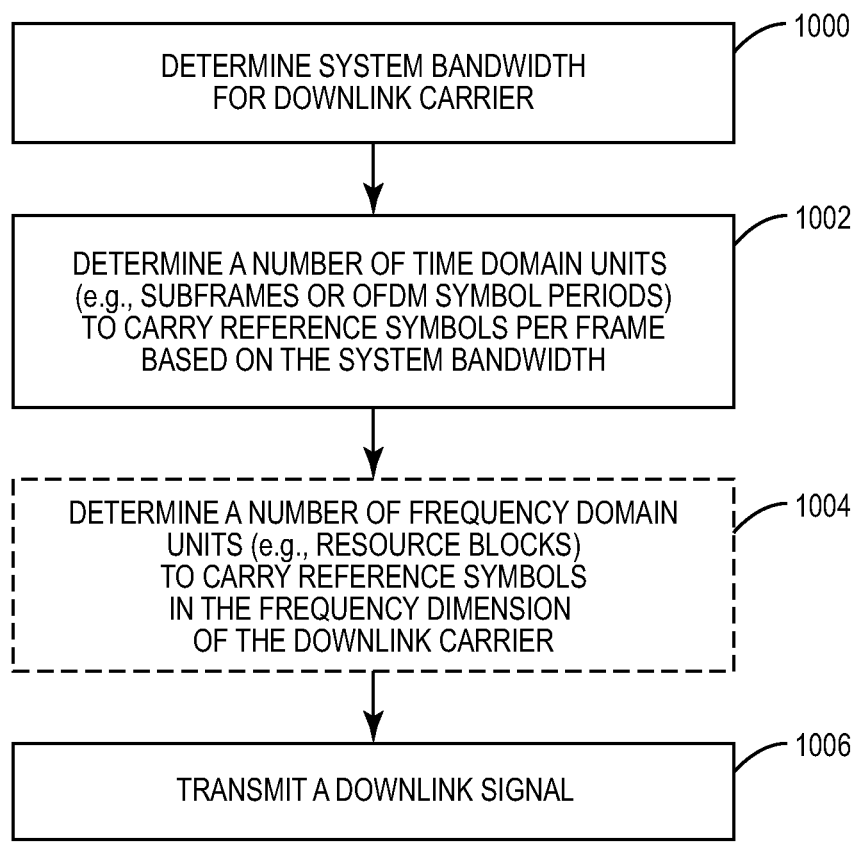
FIG. 22 is a flow chart that illustrates the operation of the base station of FIG. 4 to generate and transmit a downlink signal carrying a bandwidth adaptive reference signal according to one embodiment of the present disclosure.

FIG. 22 is a flow chart that illustrates the operation of the base station 12 to transmit a downlink signal on the downlink carrier according to one embodiment of the present disclosure. As illustrated, the base station 12 determines a system bandwidth for the downlink carrier (step 1000). For LTE, the system bandwidth may be expressed as a number of RB pairs per subframe. The system bandwidth may be programmed into the base station 12. Alternatively, the base station 12 may programmatically determine an available bandwidth for the downlink carrier. For example, in some embodiments, the base station 12 may determine the system bandwidth for the downlink carrier based on, for example, interference measurements. In yet another embodiment, the base station 12 may receive the system bandwidth for the downlink carrier from another network node such as, for example, another base station, a management node, or the like.

Based on the system bandwidth, the base station 12 determines a number of time domain units (e.g., subframes or OFDM symbol periods) that are to carry reference symbols per frame based on, or otherwise as a function of, the system bandwidth (step 1002). The number of time domain units may be determined using, for example, any of the techniques described above. In some embodiments, the base station 12 also determines a number of frequency domain units in the frequency dimension of the downlink carrier (e.g., RBs) that are to carry reference symbols based on, or otherwise as a function of, the system bandwidth of the downlink carrier (step 1004). The number of frequency domain units may be determined using, for example, any of the techniques described above. Notably, before proceeding, it should be noted that in this embodiment, steps 1000 through 1004 are programmatically performed by the base station 12 and may, in some embodiments, be repeated if desired. As an example, steps 1000 through 1004 may be performed when the base station 12 performs a cold start and potentially repeated periodically or as otherwise desired. However, in an alternative embodiment, steps 1000 through 1004 are performed during design or manufacturing of the base station 12 such that the system bandwidth of the downlink carrier, the number of time domain units per frame that carry reference symbols, and, in some embodiments, the number of frequency domain units that carry reference symbols in the frequency dimension are determined by the designer or manufacturer of the base station 12 and hard-coded into the base station 12. Next, the base station 12 transmits a downlink signal on the downlink carrier, where the downlink signal has reference symbols carried in the determined number of time domain units per frame and, in some embodiments, the determined number of frequency domain units (step 1006).

Figure 23:
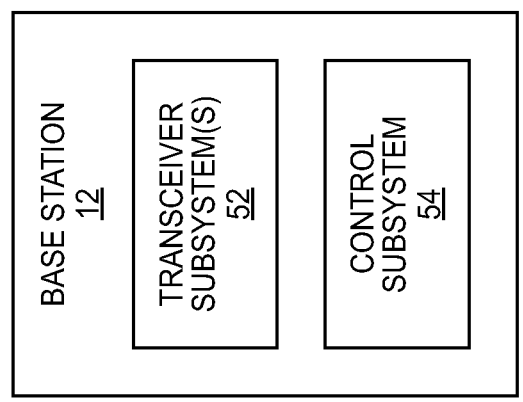
FIG. 23 is a block diagram of the base station of FIG. 4 according to one embodiment of the present disclosure.

FIG. 23 is a block diagram of the base station 12 according to one embodiment of the present disclosure. The base station 12 includes one or more transceiver subsystems 52 and a control subsystem 54. At least one of the transceiver subsystems 52 generally includes analog and, in some embodiments, digital components for wirelessly sending and receiving messages to and from wireless devices, such as the wireless device 14, in the cellular communication network 10. In particular embodiments, the transceiver subsystems 52 may represent or include radio-frequency (RF) transceivers, or separate RF transmitters and receivers, capable of transmitting such messages and/or other suitable information wirelessly to wireless devices such as the wireless device 14.

The control subsystem 54 is implemented in hardware or a combination of hardware and software. In general, the control subsystem 54 operates to communicate with the wireless device 14 potentially other base stations via the transceiver subsystem(s) 52 to transmit the downlink signal having bandwidth adaptive reference signals as described herein.

In particular embodiments, the control subsystem 54 may comprise, for example, one or several general-purpose or special-purpose microprocessors or other microcontrollers programmed with suitable software and/or firmware to carry out some or all of the functionality of the base station 12 described herein. In addition or alternatively, the control subsystem 54 may comprise various digital hardware blocks (e.g., one or more Application Specific Integrated Circuits (ASICs), one or more off-the-shelf digital and analog hardware components, or a combination thereof) configured to carry out some or all of the functionality of the base station 12 described herein. Additionally, in particular embodiments, the above described functionality of base station 12 may be implemented, in whole or in part, by the control subsystem 54 executing software or other instructions stored on a non-transitory computer-readable medium, such as random access memory (RAM), read only memory (ROM), a magnetic storage device, an optical storage device, or any other suitable type of data storage components.

Figure 24:
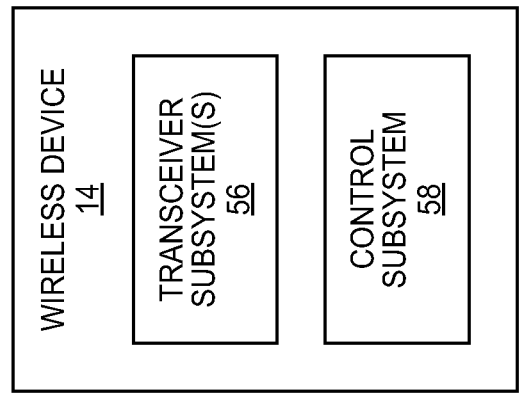
FIG. 24 is a block diagram of the wireless device of FIG. 4 according to one embodiment of the present disclosure.

FIG. 24 is a block diagram of the wireless device 14 according to one embodiment of the present disclosure. The wireless device 14 includes one or more transceiver subsystems 56 and a control subsystem 58. At least one of the transceiver subsystems 56 generally includes analog and, in some embodiments, digital components for wirelessly sending and receiving messages to and from base stations or other wireless devices in the cellular communication network 10. In particular embodiments, the transceiver subsystems 56 may represent or include RF transceivers, or separate RF transmitters and receivers, capable of transmitting such messages and/or other suitable information wirelessly to base stations or other wireless devices.

The control subsystem 58 is implemented in hardware or a combination of hardware and software. In general, the control subsystem 58 operates to receive, via the transceiver subsystem(s) 56, the downlink signal having bandwidth adaptive reference signals transmitted by the base station 12 on the downlink carrier in the manner described above.

In particular embodiments, the control subsystem 58 may comprise, for example, one or several general-purpose or special-purpose microprocessors or other microcontrollers programmed with suitable software and/or firmware to carry out some or all of the functionality of the wireless device 14 described herein. In addition or alternatively, the control subsystem 58 may comprise various digital hardware blocks (e.g., one or more ASICs, one or more off-the-shelf digital and analog hardware components, or a combination thereof) configured to carry out some or all of the functionality of the wireless device 14 described herein. Additionally, in particular embodiments, the above described functionality of the wireless device 14 may be implemented, in whole or in part, by the control subsystem 58 executing software or other instructions stored on a non-transitory computer-readable medium, such as RAM, ROM, a magnetic storage device, an optical storage device, or any other suitable type of data storage components.

The following acronyms are used throughout this disclosure.

3GPP 3rd Generation Partnership Project
ASIC Application Specific Integrated Circuit
CRS Common Reference Symbol
eNB Enhanced Node B
LTE Long Term Evolution
MHz Megahertz
ms Millisecond
OFDM Orthogonal Frequency Division Multiplexing
PBCH Physical Broadcast Channel
PSS Primary Synchronization Sequence
RAM Random Access Memory
RB Resource Block
RE Resource Element
RF Radio Frequency
ROM Read Only Memory
RRM Radio Resource Management
RS Reference Symbol
SIB System Information Block
SSS Secondary Synchronization Sequence
UE User Equipment Those skilled in the art will recognize improvements and modifications to the preferred embodiments of the present disclosure. All such improvements and modifications are considered within the scope of the concepts disclosed herein and the claims that follow.

What is claimed is:

1. A method of operation of a wireless device in a cellular communication network, comprising:
receiving a downlink signal on a downlink carrier from a base station where a number of time domain units per frame in the downlink signal that carry reference symbols is a function of a system bandwidth of the downlink carrier, wherein the number of time domain units per frame is a first value for a first system bandwidth and a second value for a second system bandwidth such that the number of time domain units per frame is variable;
processing the reference symbols in the downlink signal to provide one or more desired features; and
determining the system bandwidth of the downlink carrier.

2. The method of claim 1 wherein the number of time domain units per frame in the downlink signal that carry reference symbols is a number of subframes per frame that carry reference symbols.

3. The method of claim 1 wherein the number of time domain units per frame in the downlink signal that carry reference symbols is a number of symbol periods per frame that carry reference symbols.

4. The method of claim 1 wherein the number of time domain units per frame in the downlink signal that carry reference symbols is a function of the system bandwidth and a predetermined minimum number of reference symbols per frame such that the downlink signal comprises at least a predetermined minimum number of reference symbols per frame.

5. The method of claim 1 where the downlink signal comprises reference symbols across the entire system bandwidth of the downlink carrier.

6. The method of claim 1 wherein:
the downlink signal comprises a frame comprising a plurality of subframes in a time dimension of the downlink signal and a plurality of resource blocks in a frequency dimension of the downlink signal where the plurality of resource blocks in the frequency dimension of the downlink signal define the system bandwidth of the downlink carrier;
the number of time domain units per frame in the downlink signal that carry reference symbols is a number of subframes per frame that carry reference symbols; and
the downlink signal is such that a number of resource blocks in the frequency dimension that carry reference symbols is also a function of the system bandwidth.

7. The method of claim 1 wherein:
the downlink signal comprises a frame comprising a plurality of symbol periods in a time dimension of the downlink signal and a plurality of resource blocks in a frequency dimension of the downlink signal where the plurality of resource blocks in the frequency dimension of the downlink signal define the system bandwidth of the downlink carrier;
the number of time domain units per frame in the downlink signal that carry reference symbols is a number of symbol periods per frame that carry reference symbols; and the downlink signal is such that a number of resource blocks in the frequency dimension that carry reference symbols is also a function of the system bandwidth.

8. The method of claim 1 wherein a number of frequency domain units that carry reference symbols is also a function of the system bandwidth of the downlink carrier.

9. The method of claim 1 wherein:
the downlink signal comprises a frame comprising a plurality of subframes in a time dimension of the downlink signal and a plurality of resource blocks in a frequency dimension of the downlink signal where the plurality of resource blocks in the frequency dimension of the downlink signal define the system bandwidth of the downlink carrier; and
the number of time domain units per frame in the downlink signal that carry reference symbols is a number of subframes per frame in the downlink signal that carry reference symbols defined as 2 times ceil($R_{MIN}/N_{RS}$), where $R_{MIN}$ is a predetermined minimum number of resource block pairs per one-half frame required to carry reference symbols and $N_{RB}$ is the system bandwidth of the downlink carrier expressed as a number of resource blocks.

10. The method of claim 9 wherein a number of resource blocks in the frequency dimension that carry reference symbols is also a function of the system bandwidth of the downlink carrier and is defined as min($N_{RB}$, $R_{MIN}$).

11. The method of claim 9 wherein a number of resource blocks in the frequency dimension that carry reference symbols is equal to a number of resource blocks in the system bandwidth of the downlink carrier.

12. The method of claim 9 wherein a number of resource blocks in the frequency dimension that carry reference symbols is also a function of the system bandwidth of the downlink carrier and is defined as ceil($R_{MIN}/C_{SF}$), where $C_{SF}$ is one-half of the number of subframes per frame in the downlink signal that carry reference symbols.

13. The method of claim 1 wherein:
the downlink signal comprises a frame comprising a plurality of subframes in a time dimension of the downlink signal and a plurality of resource blocks in a frequency dimension of the downlink signal where the plurality of resource blocks in the frequency dimension of the downlink signal define the system bandwidth of the downlink carrier and each resource block comprises reference symbol locations for a plurality of transmit ports;
the number of time domain units per frame in the downlink signal that carry reference symbols is a number of subframes per frame in the downlink signal that carry reference symbols, where the number of subframes per frame in the downlink signal that carry reference symbols is a function of the system bandwidth of the downlink carrier; and
a number of the plurality of transmit ports that carry reference symbols is also a function of the system bandwidth of the downlink carrier.

14. The method of claim 13 wherein the same number of the plurality of transmit ports carry reference symbols in each of the number of subframes per frame that carry reference symbols.

15. The method of claim 14 wherein the number of the plurality of transmit ports that carry reference symbols is defined as min(2,ceil($R_{MIN}/N_{RB}$)), where $R_{MIN}$ is a predetermined minimum number of resource block pairs per one-half frame that are to carry reference symbols and $N_{RB}$ is the system bandwidth of the downlink carrier expressed as a number of resource blocks.

16. The method of claim 15 wherein the number of subframes per frame in the downlink signal that carry reference symbols is defined as 2 times ceil($R_{MIN}/(N_{RB} \times C_{PORTS})$), where $C_{PORTS}$ is the number of the plurality of transmit ports that carry reference symbols.

17. The method of claim 16 wherein a number of resource blocks in the frequency dimension that carry reference symbols is also a function of the system bandwidth of the downlink carrier and is defined as:

$$\min\left(N_{RB}, \text{ceil}\left(\frac{R_{MIN}}{C_{PORTS} \times C_{SF}}\right)\right)$$

where $N_{RB}$ is the system bandwidth of the downlink carrier expressed as a number of resource blocks, $R_{MIN}$ is a predetermined minimum number of resource block pairs per one-half frame that are to carry reference symbols, and $C_{PORTS}$ is the number of the plurality of transmit ports that carry reference symbols.

18. The method of claim 13 wherein the number of the plurality of transmit ports that carry reference symbols in one of the number of subframes per frame that carry reference symbols is different than the number of the plurality of transmit ports that carry reference symbols in a different one of the number of subframes per frame that carry reference symbols.

19. The method of claim 18 wherein the number of the plurality of transmit ports that carry reference symbols is defined as min(2,ceil($R_{MIN}/N_{RB}$)), where $R_{MIN}$ is a predetermined minimum number of resource block pairs per one-half frame that are to carry reference symbols and $N_{RB}$ is the system bandwidth of the downlink carrier expressed as a number of resource blocks.

20. The method of claim 19 wherein:
the number of subframes per frame in the downlink signal that carry reference symbols in a first transmit port of the plurality of transmit ports is defined as 2 times ceil($R_{MIN}/(N_{RB} \times C_{PORTS})$), where $C_{PORTS}$ is the number of the plurality of transmit ports that carry reference symbols; and
the number of subframes per frame in the downlink signal that carry reference symbols in a second transmit port of the plurality of transmit ports is defined as 2 times floor($R_{MIN}/(N_{RB} \times C_{PORTS})$).

21. The method of claim 20 wherein a number of resource blocks in the frequency dimension that carry reference symbols is also a function of the system bandwidth of the downlink carrier and is defined as:

$$C_{RB} = N_{RB}$$

where $N_{RB}$ is the system bandwidth of the downlink carrier expressed as a number of resource blocks.

22. The method of claim 1 wherein:
the downlink signal comprises a frame comprising a plurality of symbol periods in a time dimension of the downlink signal and a plurality of resource blocks in a frequency dimension of the downlink signal where the plurality of resource blocks in the frequency dimension of the downlink signal define the system bandwidth of the downlink carrier; and
the number of time domain units per frame in the downlink signal that carry reference symbols is a number of symbol periods per frame in the downlink signal that carry reference symbols defined as 2 times ceil $(R_{MIN\_SYM}/N_{RB})$, where $R_{MIN\_SYM}$ is a predetermined minimum number of 1 resource block by 1 symbol period units per one-half frame required to carry reference symbols and $N_{RB}$ is the system bandwidth of the downlink carrier expressed as a number of resource blocks.

23. The method of claim 22 wherein a number of resource blocks in the frequency dimension that carry reference symbols is also a function of the system bandwidth of the downlink carrier and is defined as $\text{ceil}(R_{MIN\_SYM}/C_{SYM})$ where $C_{SYM}$ is the number of time domain units per half-frame in the downlink signal that carry reference signals.

24. The method of claim 1 further comprising
determining the number of time domain units per frame in the downlink signal that carry reference symbols as a function of the system bandwidth.

25. The method of claim 24 wherein determining the system bandwidth comprises receiving an indicator of the system bandwidth via signaling from the base station in the cellular communication network.

26. The method of claim 24 wherein determining the system bandwidth comprises:
detecting a number of time units per frame in the downlink signal that carry reference symbols; and
determining the system bandwidth based on the number of time units per frame in the downlink signal that carry reference symbols.

27. The method of claim 26 wherein the time units are subframes.

28. The method of claim 26 wherein the time units are symbol periods.

29. The method of claim 24 wherein determining the system bandwidth comprises:
detecting a primary synchronization signal in a subframe N, where an offset D is an integer greater than or equal to zero and the subframe N+D is known to carry reference symbols;
determining whether reference symbols are carried in subframe N+D+1;
in response to determining that reference symbols are not carried in the subframe N+D+1, determining that the system bandwidth is a first predetermined value; and
in response to determining that reference symbols are carried in the subframe N+D+1:
determining whether reference symbols are carried in the subframe N+D+2; and
in response to determining that reference symbols are not carried in subframe N+D+2, determining that the system bandwidth is a second predetermined value that is less than the first predetermined value.

30. The method of claim 29 wherein, in response to determining that reference symbols are carried in the subframe N+D+2, determining that the system bandwidth is a third predetermined value that is less than the first and second predetermined values.

31. The method of claim 24 further comprising determining a number of frequency domain units per time domain unit that carry reference symbols as a function of the system bandwidth.

32. A wireless device for operation in a cellular communication network, comprising:
a transceiver subsystem configured to receive a downlink signal on a downlink carrier from a base station where a number of time domain units per frame in the downlink signal that carry reference symbols is a function of a system bandwidth of the downlink carrier, wherein the number of time domain units per frame is a first value for a first system bandwidth and a second value for a second system bandwidth such that the number of time domain units per frame is variable; and
a control subsystem configured to:
process the reference symbols in the downlink signal to provide one or more desired features; and
determine the system bandwidth of the downlink carrier.

33. A method of operation of a base station in a cellular communication network, comprising:
transmitting, from the base station, a downlink signal on a downlink carrier where a number of time domain units per frame in the downlink signal that carry reference symbols is a function of a system bandwidth of the downlink carrier, wherein the number of time domain units per frame is a first value for a first system bandwidth and a second value for a second system bandwidth such that the number of time domain units per frame is variable; and
determining the system bandwidth of the downlink carrier.

34. A base station in a cellular communication network, comprising:
a control subsystem; and
a transceiver subsystem associated with the control subsystem and configured to transmit a downlink signal on a downlink carrier where a number of time domain units per frame in the downlink signal that carry reference symbols is a function of a system bandwidth of the downlink carrier, wherein the number of time domain units per frame is a first value for a first system bandwidth and a second value for a second system bandwidth such that the number of time domain units per frame is variable, wherein the control subsystem is configured to determine the system bandwidth of the downlink carrier.

* * * * *